United States Patent [19]

Fehskens et al.

[11] Patent Number: 5,475,838
[45] Date of Patent: Dec. 12, 1995

[54] EXTENSIBLE ENTITY MANAGEMENT SYSTEM INCLUDING RULE-BASED ALARMS

[75] Inventors: Leonard G. Fehskens, Westboro; Colin Strutt, Westford; Steven K. Wong, Chelmsford; Jill F. Callander, Hudson; Peter H. Burgess, Salisbury, all of Mass.; Kathy J. Nelson, Nashua, N.H.; Matthew J. Guertin, Westford, Mass.; Gerard R. Plouffe, Nashua, N.H.; Mark W. Sylor, Nashua, N.H.; Kenneth W. Chapman, Nashua, N.H.; Robert C. Schuchard, Ashburnham, Mass.; Stanley I. Goldfarb, Hudson, Mass.; Anil V. Navkal, Maynard, Mass.; Dennis O. Rogers, Leominster, Mass.; Linsey B. O'Brien, Wellesley, Mass.; Philip J. Trasatti, Brookline, N.H.; Christine C. Chan-Lizardo, Chelmsford, Mass.; Benjamin M. England, Haverhill, Mass.; James L. Lemmon, Jr., Leominster, Mass.; Richard L. Rosenbaum, Pepperell, Mass.; Ruth E. J. Kohls, Acton, Mass.; David L. Aronson, Boston, Mass.; Allan B. Moore, Acton, Mass.; Robert R. N. Ross, Mansfield, Mass.; Danny L. Smith, Haverhill, Mass.; William C. Adams, Jr., Topsfield, Mass.; Arundahati G. Sankar, Andover, Mass.; G. Paul Koning, Brookline, N.H.; Sheryl F. Namoglu, Mount Vernon, N.H.; Mark J. Seger, Harvard, Mass.; Timothy M. Dixon, Woodcote Reading, United Kingdom; Jeffrey R. Harrow, Amherst, N.H.

[73] Assignee: Digital Equipment Corporation, Maynard, Mass.

[21] Appl. No.: 159,737

[22] Filed: Nov. 30, 1993

Related U.S. Application Data

[60] Division of Ser. No. 402,391, Sep. 7, 1989, Pat. No. 5,345,587, which is a continuation-in-part of Ser. No. 244,114, Sep. 13, 1988, abandoned, and Ser. No. 244,495, Sep. 13, 1988, abandoned, and Ser. No. 244,503, Sep. 13, 1988, abandoned, and Ser. No. 244,506, Sep. 13, 1988, abandoned, and Ser. No. 244,691, Sep. 13, 1988, abandoned, and Ser. No. 244,730, Sep. 13, 1988, abandoned, and Ser. No. 244,742, Sep. 13, 1988, abandoned, and Ser. No. 244,834, Sep. 13, 1988, abandoned, and Ser. No. 244,845, Sep. 13, 1988, abandoned, and Ser. No. 244,850, Sep. 13, 1988, abandoned, and Ser. No. 244,851, Sep. 13, 1988, abandoned, and Ser. No. 244,919, Sep. 13, 1988, abandoned.

[51] Int. Cl.[6] .............................. G06F 15/16; G06F 11/00
[52] U.S. Cl. ........................ 395/185.1; 395/54; 395/650; 395/200.11; 364/229; 364/232.7; 364/242.95; 364/284.4; 364/285; 364/DIG. 1; 370/13
[58] Field of Search .............................. 395/50, 54, 325, 395/600, 650

[56] References Cited

U.S. PATENT DOCUMENTS 4,064,392  12/1977  Desalu .

(List continued on next page.)

OTHER PUBLICATIONS

Brusil et al., "Toward A Unified Theory of Managing Large Networks", IEEE Spectrum, Apr., 1989, pp. 39–42.

(List continued on next page.)

*Primary Examiner*—Kevin J. Teska
*Assistant Examiner*—Ayni Mohamed
*Attorney, Agent, or Firm*—Wood, Herron & Evans

[57] ABSTRACT

A system for managing an assemblage of entities. The entities interface within the assemblage for control of primary information handling functions and further interface with the system to permit the carrying out of management functions. The system includes management modules adapted to carry out management functions by independently interpreting and executing commands, a kernel including a table of dispatch pointers for directing the commands to the respective modules in which they are to be interpreted and executed, and an enroller for enrolling new (Abstract continued on next page.)

ALARMS FUNCTIONAL MODULE modules into the system by adding further pointers to the table. In addition, the system includes: a module adapted to independently interpret and execute selected management-related commands; stored records relating to accessed management information, each record indicating an associated time; an information manager, responsive to commands having a time schedule, for retrieving information from the records or accessing information from the entities, including a scheduler for issuing subsidiary accesses or retrievals at possibly multiple times according to the schedule; storage containing domain information defining groups of entities, where the kernel may issue a commands to a group by issuing individual commands to appropriate modules; a common command syntax including fields for identifying the entity and the operation to be performed; a module that stores rules identifying alarm conditions, including a generator for generating rules and an alarm detector for detecting an alarm condition in response to the rules; a module adapted to carry out self-management functions by interpreting and executing commands.

20 Claims, 21 Drawing Sheets

U.S. PATENT DOCUMENTS

| | | | |
|---|---|---|---|
| 4,153,931 | 5/1979 | Green et al. | |
| 4,162,520 | 7/1979 | Cook et al. | |
| 4,387,427 | 6/1983 | Cox et al. | |
| 4,394,727 | 7/1983 | Hoffman et al. | |
| 4,428,043 | 1/1984 | Catiller et al. | |
| 4,430,699 | 2/1984 | Segarra et al. | |
| 4,466,063 | 8/1984 | Segarra et al. | |
| 4,475,156 | 10/1984 | Federico et al. | |
| 4,479,196 | 10/1984 | Ferrer et al. | |
| 4,495,570 | 1/1985 | Kitajima et al. | |
| 4,509,851 | 4/1985 | Ippolito et al. | |
| 4,530,051 | 7/1985 | Johnson . | |
| 4,570,217 | 2/1986 | Allen et al. | |
| 4,604,686 | 8/1986 | Reiter et al. | |
| 4,628,508 | 12/1986 | Sager et al. | |
| 4,636,947 | 1/1987 | Ward . | |
| 4,642,758 | 2/1987 | Teng . | |
| 4,644,468 | 2/1987 | Doster et al. | |
| 4,658,359 | 4/1987 | Palatucci et al. | |
| 4,677,588 | 6/1987 | Benjamin . | |
| 4,698,766 | 10/1987 | Entwistle et al. | |
| 4,714,995 | 12/1987 | Materna et al. | |
| 4,747,040 | 5/1988 | Blanset et al. | |
| 4,750,114 | 6/1988 | Hirtle . | |
| 4,751,635 | 6/1988 | Kret . | |
| 4,754,395 | 6/1988 | Weisshaar et al. | |
| 4,763,329 | 8/1988 | Green . | |
| 4,768,150 | 8/1988 | Chang et al. | |
| 4,769,772 | 9/1988 | Dwyer . | |
| 4,783,752 | 11/1988 | Kaplan et al. | |
| 4,787,034 | 11/1988 | Szoke . | |
| 4,791,558 | 12/1988 | Chaitin et al. | |
| 4,792,896 | 12/1988 | Maclean et al. | |
| 4,792,941 | 12/1988 | Yanosy, Jr. et al. | |
| 4,800,488 | 1/1989 | Agrawal et al. | |
| 4,805,134 | 2/1989 | Calo et al. | |
| 4,811,207 | 3/1989 | Hikita et al. | |
| 4,816,208 | 3/1989 | Woods et al. | |
| 4,817,092 | 3/1989 | Denny . | |
| 4,819,160 | 4/1989 | Tanka et al. | |
| 4,823,343 | 4/1989 | Takahashi . | |
| 4,827,423 | 5/1989 | Beasley et al. | |
| 4,829,445 | 5/1989 | Burney . | |
| 4,835,674 | 5/1989 | Collins et al. | |
| 4,835,699 | 5/1989 | Mallard . | |
| 4,845,658 | 7/1989 | Gifford . | |
| 4,853,843 | 8/1989 | Ecklund . | |
| 4,868,733 | 9/1989 | Fujisawa . | |
| 4,870,610 | 9/1989 | Belfer . | |
| 4,881,166 | 11/1989 | Thompson . | |
| 4,884,217 | 11/1989 | Skeirik et al. | |
| 4,937,784 | 6/1990 | Masai et al. | |
| 4,965,742 | 10/1990 | Skeirik | 395/54 |
| 5,058,000 | 10/1991 | Cox . | |
| 5,089,954 | 2/1992 | Rago . | |

OTHER PUBLICATIONS

Chen; "The Entity–Relationship Model–Toward a Unified View of Data," ACM Transactions on Database System, 1:9–36, 1976.

LaPelle et al., "The Evolution of Network Management Products", Digital Technical Journal, No. 3, Sep., 1986, pp. 129–141.

Supnik, "Debugging Techniques in Large Systems" Proc. Courant Computer Science Symposium 1, Jun. 29–Jul. 1, 1970.

Sylor, "Managing Phase V DECnet Networks: The Entity Model", IEEE Network, Mar. 1988, vol. 2, No. 2, pp. 30–36.

Sylor, "The NMCC/DECnet Monitor Design", Digital Technical Journal, No. 3, Sep. 1986, pp. 129–141.

Teorey et al.; "A Logical Design Methodology for Relational Databases Using the Extended Entity–Relationship Model," Computer Surveys, 18: 198–222, 1986.

ANSI, ISO/T97/SC21/N2066, US Secretariat for OSI, Jul. 1987, "Information Processing–Open Systems Interconnection–Management Information Services–Structure of Management Information".

ANSI, X3T5.4, Output Document X3T5.4/87–100, Draft, "Recommendation for User–Network Management and Maintenance Protocol General Aspects", 1987.

ANSI X3T5.4, Output Document X3T5.4/87–167, Sep. 18, 1987, "A Model of Managed Objects–Operations and Informations", X3 Secretariat.

ANSI X3T5.4, Output Document X3T5.4/87 166, Sep. 18, 1987, "A MOdel of Managed Objects–Concepts", X3 Secretariat.

ANSI X3T5.4, Output Document X3T5.4/84–124, "Structure of OSI Management Information", Oct. 5, 1984.

ANSI X3T5.4/84–101, Aug. 3, 1984, "Conceptual Schema for OSI Management Information".

Digital Equipment Corporation, Output Document X3T5.4/87–168 of the X3T5.4 ANSI standards group, Sep. 18, 1987.

IEEE Task Group, "Layer–Specific Systems Management Guidelines", 802.1 Network Management Task Group, Revision A, Sep. 2, 1987, X3T5.4/87–19.

ISO, X3T5.4/87–70, Mar. 9, 1987, "Towards a Model for the Structure of Management Information" (SMI).

ISO, Documents TC97/SC21/N2058–9595–1 Annex A, Nov. 1987; TC97/SC21/N2058–9595–1, Dec. 16, 1987, and TC97/SC21/N2058–9595–2, Dec. 16, 1987.

JISC, ISO/TC97/SC21/N2061, Japan Secretariat, Aug. 10, 1987, "Information Processing Systems–Open Systems Interconnection Basic Reference Model Part 4–OSI Management Framework".

JISC, ISO/TC97/SC21/WG4/N397, Japan Secretariat, Jun. 9, 1987, "Statement Concerning the Identification of Management Information".

Output Document X3T5.4/87–63, Draft IEEE Standard 802.1, "Overview, Interworking and Systems Management", Jan. 1987.

USA OSI Secretariat, Output Document X3T5.4/87–149, "Structure of OSI Management Information", Dec. 6, 1984.

```
       <MANAGEMENT SPECIFICATION">::=                           41
48 ⌐    ⎡ MANAGEMENT SPECIFICATION <SPEC. NAME>;
        ⎢         <VERSION>— 42
    40  ⎢         <FACILITY>— 43
        ⎢         <TYPE.DECLARATION>— 44
        ⎣         <SPEC.BODY>— 45

END SPECIFICATION [<SPEC.NAME>].

45
        <SPEC.BODY>::=
                    {<GLOBAL.ENTITY.DEF>}— 45A

{<SUBORDINATE.ENTITY.DEF>}- 45C

46
     <ENTITY.DEF>::=<GLOBAL|SUBORDINATE>
                                                                47
                           ENTITY<CLASS.NAME>=<CODE>:
     50 —[SUPERIOR = <CLASS.NAME>{<CLASS.NAME>;}
     51 —IDENTIFIER = (<ATTRIBUTE.LIST>),
     52 —[SYMBOL = <STRING>:]
     53 —<ENTITY.BODY>
            END ENTITY <CLASS.NAME>;
```

FIG. 3A

```
53 ⎯<ENTITY.BODY>::=
            {<ATTRIBUTE.DEF>} ⎯ 54
            {<AGGREGATION.DEF>} ⎯ 55
            {DIRECTIVE.DEF>} ⎯ 56
            {<SUB.ENTITY.DEF>} ⎯ 57

54
   <ATTRIBUTE.DEF>::=

56 ⎯<KIND.NAME> ATTRIBUTE
        60 ⎯[<DEFAULT.POLLING.RATE>]
        61 ⎯[<MAX.POLLING.RATE>]                          68
        62 ⎯{<ATTRIBUTE.NAME>=<CODE>:DATA TYPE
                    <ATTRIBUTE.BODY>}
        63 ⎯ END ATTRIBUTE                        64

64 ⎯<ATTRIBUTE.BODY>::=

65 ⎯[<ACCESS INFO]
        66 ⎯[DISPLAY=<TRUE|FALSE>]
        67 ⎯[<DEFAULT.VALUE>]
        70 ⎯[<SYMBOL>]
        71 ⎯[<CATEGORIES>]
        72 ⎯[<MAX.POLLING.RATE>]
        73 ⎯[<DEFAULT.POLLING.RATE>]
        74 ⎯[<PRIVATE.DATA>]

55 ⎯<AGGREGATION.DEF>::=
                                              75
        76 ⎯{AGGREGATION<AGGREGATION.NAME>=<CODE>
        77 ⎯[<DIRECTIVES.SUPPORTED.LIST>]
           ⎯[<SYMBOL>]
        80 ⎯[<CATEGORIES>]
        81 ⎯<ATTRIBUTE.LIST>
           ⎯[<PRIVATE.DATA>]
        82 ⎯ END AGGREGATION <AGGREGATION.NAME>;}
```

FIG. 3B

```
56 ⎯<DIRECTIVE.DEF>::=                                      83
             {DIRECTIVE<DIRECTIVE.NAME>=<CODE>
84 ⎯[ACTION-DIRECTIVE=<TRUE|FALSE>,]
85 ⎯[DISPLAY=<TRUE|FALSE>,]
86 ⎯[<SYMBOL>]
87 ⎯[<CATEGORIES>]
90 ⎯<REQUEST.DEF>
91 ⎯<RESPONSE.DEF>
92 ⎯<EXCEPTION.DEF>
         END DIRECTIVE <DIRECTIVE.NAME>;}

90 ⎯<REQUEST.DEF>::=
            REQUEST
91 ⎯[ARGUMENTS      92
               {<ARG.NAME>=<CODE>
93 ⎯[DISPLAY=<TRUE|FALSE>]
94 ⎯[<REQUIRED>]
95 ⎯[<UNITS>]
96 ⎯[<DEFAULT>]
97 ⎯[<SYMBOL>]
100 ⎯[<PRIVATE.DATA>]
               j}]
         END REQUEST;
```

FIG. 3C

```
91 ─<RESPONSE.DEF>::=                         101
        102 ─{RESPONSE <RESPONSE.NAME>=<CODE>:
        103 ─{SEVERITY=<SUCCESS|INFORMATIONAL>]
        104 ─[TEXT=<TEXT.STRING>
              [ARGUMENTS           ─105
                   {<ARG.NAME>=<CODE>:
            106 ─[<UNITS>]
            107 ─[<SYMBOL>]
                ,}]

END RESPONSE<RESPONSE.NAME>;}

92
  \<EXCEPTION.DEF>::=              111
        112─[{EXCEPTION<EXCEPTION.NAME=<CODE>:
                  SEVERITY=<WARNING|ERROR|FATAL>,
            113 ─TEXT=<TEXT.STRING>
              114─[ARGUMENTS       ─115
                   {<ARG.NAME>=<CODE>
              116 ─[<UNITS>]
              117 ─[<SYMBOL>]
                 ;}]

END EXCEPTION [<EXCEPTION.NAME>];}]
```

FIG. 3D

DATA DICTIONARY

DISPATCH TREE

DISPATCH ENTRY 134

ALARMS FUNCTIONAL MODULE

FIG. 10B

212 — ALARM RULE STRUCTURE  213  214  216  210

IF [⟨EXPRESSION⟩ (REL.OP) ⟨EXP.VAL⟩⟨TIME⟩]

212 — ⟨EXPRESSION⟩ ::=

⟨ENTITY⟩ ⟨ATTRIBUTE⟩
⎵⎵⎵⎵⎵⎵⎵⎵⎵⎵⎵⎵
215

216 ⟨TIME CLAUSE⟩ ::= AT ⟨TIME.ARG⟩ {,⟨TIME.ARG⟩}

EXTENSIBLE ENTITY MANAGEMENT SYSTEM INCLUDING RULE-BASED ALARMS

This is a divisional of application Ser. No. 07/402,391, now U.S. Pat. No. 5,345,587 filed Sep. 7, 1898, which is a continuation-in-part of application Ser. No. 244,114 and application Ser. No. 244,495 and application Ser. No. 244,503 and application Ser. No. 244,506 and application Ser. No. 244,691 and application Ser. No. 244,730 and application Ser. No. 244,742 and application Ser. No. 244,834 and application Ser. No. 244,845 and application Ser. No. 244,850 and application Ser. No. 244,851 and application Ser. No. 244,919, all having a filing date of Sep. 13, 1988 and all are abandoned now.

BACKGROUND OF THE INVENTION

The invention relates generally to the field of management of complex systems, and more particularly to arrangements for managing complex systems such as distributed digital data processing systems.

As digital data processing systems, or computers, have become smaller and less expensive, individual computers are being used by individuals and small groups. To enhance sharing of data, communications among users and economy in connection with resources which may be infrequently used by an individual, computers have been connected into networks which communicate by means of messages transmitted over communications links, which include, in addition to the computers used directly by the various users, servers which, for example, store large amounts of data which may be accessed, used and updated by a number of users in the system, thereby facilitating sharing of data. Servers may also control printers, telecommunications links, and so forth. In addition, servers may provide specialized computational services, such as database searching and sorting, and so forth. The various computers, which are termed clients, and servers are interconnected by a communications link to permit messages to be transferred among the various computers and servers comprising the distributed system.

SUMMARY OF THE INVENTION

The invention provides a new and improved control arrangement for controlling and monitoring a complex system, such as a distributed digital data processing system in which a plurality of computers communicate over, for example, a local area network.

In brief summary, the control arrangement includes one or more presentation modules, functional modules and access modules that communicate through kernel means to process requests generated in response to commands from an operator, and to display responses to the operator. The presentation modules handle operator interface functions, including receipt of commands from an operator and presentation of responses thereto. In response to a command from an operator, the presentation module generates a request. The kernel means receives a request and may route it to a functional module for further processing. The functional modules handle general functional operations in connection with processing a request. In response to a request, a functional module generates one or more requests (sometimes for convenience called subsidiary requests in what follows) that it transfers to the kernel means or to other functional modules for processing. The kernel means routes subsidiary requests which it receives to an access module for processing. The access modules handle primitive operations in connection with the entities comprising the complex system.

In general, in one aspect, the invention features a system for controlling and carrying out management functions over an assemblage of entities, wherein the entities interface within the assemblage for control of primary information handling functions and the entities further interface with the system to permit the carrying out of the management functions. The system includes stored management modules adapted to carry out the management functions by independently interpreting and executing selected management-related commands, a kernel comprising a table of dispatch-pointers for directing the commands to the respective modules in which they are to be interpreted and executed, and an enroller for enrolling new management modules into the system by adding further pointers to the table.

Preferred embodiments of this aspect include the following features. The management modules are adapted for one or more of requesting status information from the entities, modifying management parameters of the entities, or enabling self-test modes of the entities. The system also includes stored management specification information listing, in compliance with a universal specification language having a common syntax for representing the attributes and operations of any arbitrary manageable entity, the attributes which relate to the entities' functioning and control, and the management functions of the entities. The management specification information may further list the attributes and operations of entities which are subordinate to other entities. The management specification information includes polling information in predetermined fields of the common syntax. The polling information includes fields for specifying a default rate and a maximum polling rate at which the values of attributes should be requested from the entities. The management specification information may also include partition information in predetermined fields of the common syntax, the partition information representing groups of attributes having common data types. The management specification information may also include aggregation information in predetermined fields of the common syntax. The aggregation information represents groups of attributes having related functions in the management of the entity.

The management specification information may also include command information in predetermined fields of the common syntax, the command information lists the management functions which the entities are adapted to perform, the structure of the commands to be issued to the entities, and the structure of the replies to be received. The structure of the requests to be issued includes fields for listing arguments to a command. The structure of the replies to be received includes fields used for indicating the successful completion of the requested operation. The structure of the replies to be received includes fields used for indicating error conditions causing unsuccessful completion of the requested operation.

At least one management module includes an access module implementing protocols for communicating with one or more entities. The protocols are consistent with Ethernet standards or DECnet Phase IV standards, or DECnet Phase V standards.

Each command includes fields listing at least a related entity and operation, and the kernel includes a dispatcher for receiving and forwarding commands based at least in part on the entity and operation listed therein. The table of dispatch pointers comprises a directed graph of data structures, successive data structures in the graph corresponding to fields of the commands. The dispatcher includes a parser for parsing the directed graph in accordance with the entity and operation listed in a command to locate a terminal data structure having a dispatch pointer. The directed graph includes wildcard flags and successive data structures which may correspond to any value in a particular field of a command. The directed graph includes ellipsis flags and successive data structures which may correspond to any number of values in fields of commands. The parser includes a best-match unit for determining the most exact match for fields of a command, by searching first for exact matches for fields and then for wildcard matches for fields, or by searching first for exact matches for fields, then for ellipsis matches for fields.

The system includes a presentation device for displaying information to a user and receiving commands from a user, the commands and information being in specific predetermined formats. A presentation module receives commands from the presentation device and forwards information to the presentation device, the presentation module including conversion code to convert information received from an entity into a predetermined format for the presentation device, and forwarding code for forwarding commands from the presentation device to the dispatcher. The presentation module includes user interface information defining modes in which users interact with the system. The user interface information includes help information for providing information to the user on how to use the system. The user interface information includes graphic mode information defining pop-up menu contents and command line parse tables.

The kernel also includes a class database defining the different management information available from the respective entities. The presentation module includes menu generation routines for extracting data from the class database and generating menus of valid commands for display to the user. The menu generation routines are adapted to determine information relating to the configuration of said assemblage and generate menus of available entities for display to the user.

In general, in another aspect, the invention features a management module adapted to be stored for carrying out management functions by independently interpreting and executing selected management-related commands, for use in a system for controlling and carrying out management functions over an assemblage of entities. In preferred embodiments, the module includes dispatch pointers pointing to the module and associated with commands which are interpreted and executed by the module.

In general, in another aspect, the invention features a system for retrieving management information about an assemblage of entities in response to commands specifying a time schedule, wherein the entities interface within the assemblage for control of primary information handling functions and the entities further interface with the system to permit the accessing of the management information. The system includes storage containing records relating to the management information, each record including an indication of an associated time, and an information manager for retrieving management information contained in the records or accessing management information from the entities in response to a command, comprising a scheduler for possibly issuing a succession of subsidiary accesses or retrievals corresponding to the command at possibly multiple times according to the time schedule.

Preferred embodiments of this aspect include the following features.

A historical data recorder periodically accesses and stores new management information in the records in response to a predetermined schedule. The system is adapted to respond to a command specifying at least one desired time range, the time range possibly including past, present and future times, and the information manager includes means for satisfying the command by retrieving management information contained in the records, if possible, and otherwise accessing information relating to the specified time range from the entities. The information manager is configured to satisfy a command having a time range which includes all times prior to a specified time, by retrieving any record which is stored in the records during the time range, or otherwise accessing the information from the entities. The information manager is configured to satisfy a command by immediately accessing management information from the entities. Events occurring within the network are treated as a component of the state of the network and are stored in the records.

In general, in another aspect, the invention features a system for controlling and carrying out management functions over an assemblage of entities, wherein the entities interface within the assemblage for control of primary information handling functions and the entities further interface with the system to permit the carrying out of the management functions. The system includes stored management modules adapted to carry out the management functions by independently interpreting and executing selected management-related commands, storage containing domain specification information defining groups of entities, and a kernel adapted to issue commands to all entities of one the group by issuing individual commands to appropriate management modules.

Preferred embodiments of this aspect include the following features. The domain specification information complies with a universal specification language having a common syntax for representing any arbitrary group of entities. The common syntax provides for the incorporation of entities from a first domain into a second domain by reference to the first domain. The common syntax provides for the creation of subdomains of entities wholly contained within other domains. At least one management module comprises a domain management module for establishing and maintaining the domain specification information. The domain management module is responsive to commands for one or more of adding or deleting entities from groups, creating groups, or deleting groups. The domain management module is responsive to commands having filter procedures selecting entities of one or more particular domains. The filter procedures may select entities of subdomains wholly contained within other domains.

In general, in another aspect, the invention features a system for controlling and carrying out management functions over an assemblage of entities, wherein the entities interface within the assemblage for control of primary information handling functions and the entities further interface with the system to permit the carrying out of the management functions. The system includes stored management modules adapted to carry out the management functions by independently interpreting and executing selected management-related commands and issuing other commands to other modules, each command listing, in conformance with a common command syntax, the identity of the related entity and the operation to be performed, and a kernel comprising a table of dispatch pointers for directing the commands to the respective modules in which they are to be interpreted and executed.

Preferred embodiments of this aspect include the following features. The common command syntax provides fields for specifying subordinate entities, attributes, and operations. A first category of the management modules includes functional modules adapted to provide functional manipulation of data provided by the entities, and a second category of the management modules includes access modules adapted to implement the protocols for communication with the entities. The table of dispatch pointers includes a functional-access aspect facilitating communication between modules of the first category and other modules of the first category or modules of the second category. The system includes presentation modules adapted to receive commands from and forward information to the user using the primary information handling functions of the entities. The table of dispatch pointers includes a presentation-functional aspect facilitating communication between the presentation modules and modules of the first category. One module of the first category comprises a control functional module for communicating received commands directly to modules of the second category.

In general, in another aspect, the invention features a system for controlling and carrying out management functions over an assemblage of entities, wherein the entities interface within the assemblage for control of primary information handling functions and the entities further interface with the system to permit the carrying out of the management functions. The system includes stored management modules adapted to carry out the management functions by executing selected management-related commands, and at least one module storing rules identifying selected alarm conditions and comprising a rule generator for generating rules for storage and an alarm condition detector for detecting an alarm condition in response to the contents of the rules.

Preferred embodiments of this aspect include the following features. The management modules are adapted to carry out the management functions by independently interpreting and executing selected management-related commands. At least some management functions generate management information indicating the status of the primary information handling functions of one or more entities. The rules specify values for the management information at one or more times. The system includes storage containing records of the management information, each record including an indication of an associated time. The system includes an historical data recorder for periodically accessing and storing new management information in the records in response to a predetermined schedule.

In general, in another aspect, the invention features a system for controlling and carrying out entity management functions over an assemblage of entities and also controlling and carrying out self-management functions over itself, wherein the entities interface within the assemblage for control of primary information handling functions and the entities further interface with the system to permit the carrying out of management functions. The system includes at least one stored management module adapted to carry out the entity management functions by independently interpreting and executing selected commands, and further adapted to carry out the self-management functions on itself by interpreting and executing other commands, and a kernel comprising a table of dispatch pointers for directing the entity and self management commands to the respective modules in which they are to be interpreted and executed.

Preferred embodiments of this aspect include the following features. Each entity management command lists, in conformance with a common command syntax, the identity of the related entity and the operation to be performed, and each self-management command lists, in conformance with the common command syntax, the identity of the related module and the operation to be performed. The kernel includes a dispatcher for receiving and forwarding commands based at least in part on the operation and entity or module listed therein.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 10B depicts the structure of rules used in establishing alarm conditions.

GENERAL DESCRIPTION

Figure 1A:
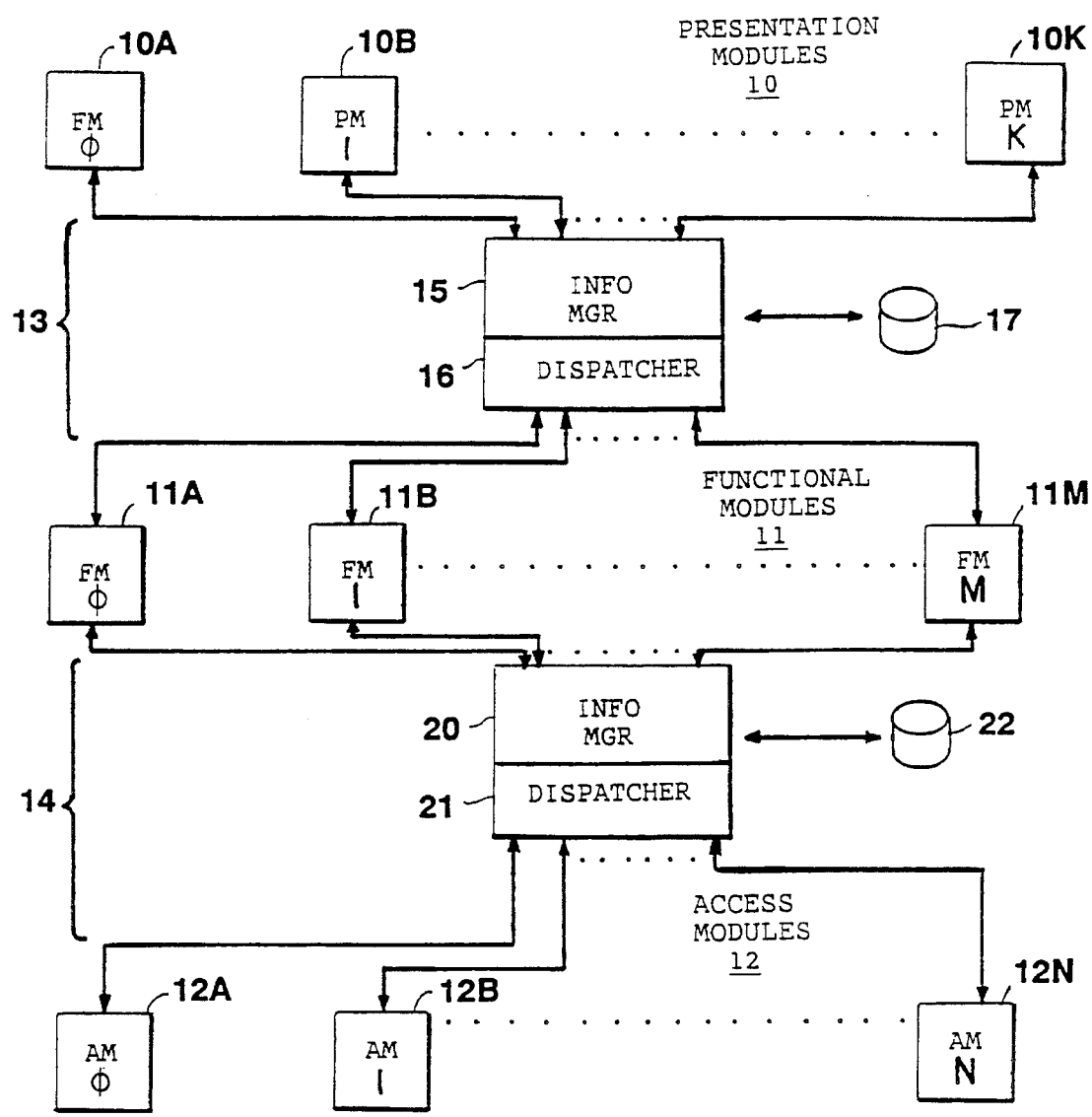
FIG. 1A is a functional block diagram of a control arrangement constructed in accordance with the invention.

FIG. 1A depicts a functional block diagram of an arrangement constructed in accordance with the invention for controlling and monitoring the status and condition of a complex system. (The complex system itself is not shown.) Preliminarily, one example of a complex system controlled by the arrangement depicted in FIG. 1A includes a distributed digital data processing system, comprising a plurality of nodes, including individual computers, terminals, terminal servers and other components, which communicate by means of messages transmitted over a network. One example of such a digital data processing system is described in U.S. patent application Ser. No. 06/616,553, , filed May 1, 1984 and now abandoned. It will be appreciated, however, that the control arrangement depicted in FIG. 1A is not limited to the control of a distributed digital data processing system, but may be used to control a number of diverse types of complex systems.

Such complex systems are challenging to manage, particularly because the status and capabilities of the complex system are constantly changing. Therefore, the management arrangement and the management functions it provides must also change to adapt to new management requirements of the system. As will be discussed in detail later, the arrangement of FIG. 1A features extensibility, which allows the arrangement to adapt efficiently to changes in the complex system.

For the purposes of this document, the components of the complex system will be called entities. Entities are discussed in terms of classes and instances. An entity class defines entities of a particular type, e.g. one class would include all local area network bridges from a given vendor. Each entity is a member of a class, and forms an instance of that class.

With reference to FIG. 1A, the control arrangement includes several types of control modules, including presentation modules 10A through 10K (generally identified by reference numeral 10), functional modules 11A through 11M (generally identified by reference numeral 11) and access modules 12A through 12N (generally identified by reference numeral 12). The presentation modules 10 generally provide the user interface for the operators providing control for the complex system, including control of terminals used by the system operators. Each functional module 11 generally provides management control and monitoring in connection with a class of functions. Each access module 12 generally provides management control for a particular type of controllable entity, in a set belonging to a class of controllable entities, in the complex system. The presentation modules 10 communicate with functional modules 11 through a presentation-function aspect of a kernel 13, 14, hereafter called simply the presentation-function kernel 13, and the functional modules 11 communicate with the access modules through a function-access aspect of the kernel 13, 14, hereafter called simply the function-access kernel 14.

The functions that are required from control modules 10, 11, 12 may vary widely depending upon the topology of the complex system being managed. Therefore, to provide the arrangement with adaptability and extensibility, control modules 10, 11, 12 may be dynamically added or removed from the arrangement to adapt the arrangement to the topology of a particular complex system, and to the changes in that topology.

To further the goals of adaptability and extensibility, the control modules 10, 11, 12 form a "division of labor" for the tasks to be performed in management of the complex system. In this way, the tasks associated with, e.g., the management protocols of a distributed data processing system, may be separated from the tasks associated with, e.g., the display of management information to the user.

A. PRESENTATION MODULES

More specifically, the presentation modules 10 provide presentation services, which may comprise, for example, support for a user interface such as a video display terminal, personal computer or computer workstation, which may be used by a system operator to control the operation of the various functional modules 11 and access modules 12, thus controlling and monitoring various entities in the complex system. The presentation services are required independently of the management functions or the entities which are managed by the system depicted in FIG. 1A, and thus are provided regardless of the nature of the management functions or entities. Each operator interface or terminal may be controlled by a plurality of presentation modules 10. The various presentation modules 10 control diverse aspects of the operator interface, including such details as, for example, icons, menus, graphics and support for displaying and parsing a command line. Other presentation modules 10 provide specific output support for various types of graphical displays, for example, histograms, bar charts, pie charts, or other types of pictorial representations to be displayed on a terminal screen for an operator. Still other presentation modules 10 provide transfer of management requests, which may be noted by means of icons, menus, graphics or commands which the operator entered on the command line, to the presentation-function kernel 13, and of management information from the presentation-function kernel 13 for display on the video display terminal used by an operator.

B. FUNCTIONAL MODULES

The functional modules 11 are associated with, and generally support, the specific management applications provided by the control arrangement depicted in FIG. 1A. The management applications exist independently of the presentation services provided by the presentation modules 10 (other than to the extent that the presentation modules 10 notify an operator of the management applications that are provided by the control arrangement) and the particular entities comprising the complex system that are being managed by the control arrangement.

A management application which could be provided by a functional module 11 would, for example, analyze the communications load in a distributed data routing system. To perform such an analysis, a functional module would access communications data, such as the number of packets sent and the number of bytes sent, from several of the entities of the distributed routing system. The functional module would then collate the information into higher-level information, such as the average packet size and the percent utilization of the communications resources of the routing system. This information would then be forwarded to the user or made available to other functional modules in the execution of other management applications.

As seen in the above example, a functional module "adds value", in the form of data collation or correlation services, to management information that is available from the complex system. In addition, functional modules may make use of data produced by other functional modules to perform high-level services for management of the complex system.

In one specific control arrangement for controlling a distributed digital data processing system, one functional module 11, for example, manages the topology of the network and shows the topology to an operator through a presentation module 10.

Another functional module 11 may comprise a configuration functional module that, for example, defines the configuration, that is, the various entity instances and their inter-relationships, of the distributed digital data processing system, permits an operator to control the configuration of the network, by enabling nodes and other entity instances to be added to or deleted from the network, changes access rights by the various users of the nodes, and also maintains a configuration (or instance) database by which the operator can determine the changes to the configuration of the network over time.

Another functional module 11 in the control arrangement may, for example, control various alarms indicating occurrence of selected events in the distributed digital data processing system; this alarm functional module 11 monitors the status and condition of various entities in the distributed digital data processing system and generates an alarm indication to an operator, through the appropriate presentation module 10, in response to the status or conditions having selected values to advise the operator thereof.

Yet another functional module 11 may, for example, establish domains of entities in the distributed digital data processing system, to limit the purview of control or monitoring by an operator or to simplify control or monitoring by the operator.

Another functional module 11 may, for example, function as a historical data recorder functional module 11 to periodically poll various entities in the complex system to determine their values at specific times and establish and maintain a database of the times and values to facilitate generation of usage statistics.

Yet another functional module 11 may not control any specific aspect of the complex system, instead operating as a pass-through to permit an operator to control or monitor primitive functions of the complex systems directly through the access modules 12.

A management application may require the services and operation, in particular sequences, of a number of access modules 12, and the functional module 11 which supports the management application coordinates the sequencing of the operations by the various access modules 12 that are required to accomplish the management application. In addition, a management application provided by one functional module 11 may require the application of additional functional modules 11 in the control arrangement, which the one functional module may also coordinate.

The functional modules 11 are invoked, initially, by the presentation-functional kernel 13 in response to management requests entered by an operator obtained by a presentation module 10. A functional module 11 may also be invoked by a request directly received from another functional module 11. In addition, a functional module 11 may generate a request for processing by an access module 12.

C. ACCESS MODULES

The access modules 12 are associated with, and support, the various primitive management operations provided by the control arrangement in connection with the various entities comprising the complex system managed by the control arrangement depicted in FIG. 1A. For example, in a distributed digital data processing system, the entities may comprise, not only the various hardware components of the system, including various computers, disk and tape storage units, routers, and so forth, which may comprise nodes in the distributed digital data processing system, but also software components including virtual circuits, databases, and so forth. The access modules 12 are invoked by the functional-access kernel 14 in response to requests from a functional module 11.

Access modules 12 for controlling and monitoring a distributed digital data processing system may control several different types of nodes or different levels in the message transfer protocols used by the nodes to generate and transfer messages. One access module 12 may, for example, control and monitor the status of various portions of a bridge that links two local-area networks together, permitting messages to be passed between nodes on the two local area networks. Such an access module 12 may, for example, initialize the bridge and enable it to start operating, disable the bridge, monitor its end-to-end operation, determine the number of message passing buffers it has and determine whether it has sufficient buffers to operate effectively in the system.

Another access module 12 may control and monitor the operation of the message generation and decoding portions of the various nodes of the distributed digital data processing system, the virtual circuits, sessions and other links established between nodes, various timers and counters indicating activity or inactivity thereover and so forth. Similarly, another access module 12 may control and monitor the operation of the nodes network layer portions, which control the actual transmission and reception of messages over the network, including various message transmission and reception counters, transmission and reception timers, and so forth. Access modules 12 controlling both of these may also be used, in addition to monitoring the values of the various timers and counters, to establish limits on the number of concurrent virtual circuits and sessions that a node may maintain and establish other default and operational parameters.

In specific embodiments, access modules may provide for access to management functions at ETHERNET LAN bridges, connectivity test or IEEE 802 functions ETHERNET stations, port segmenting control and check functions at ETHERNET repeaters, or management functions at FDDI entities. In addition, access modules may provide for access to management support at DECnet Phase IV or Phase V nodes, or DEC Terminal Servers, as promulgated by Digital Equipment Co., Maynard, Mass.

D. REQUESTS

The control modules 10, 11, 12 interact with each other and with the user through requests. Requests are of two general types. A request may, for example, enable something to occur in the complex system, that is, it may cause the state or condition of the complex system to be changed. In processing such a request, one or more access modules 12 perform predetermined operations that change the state or condition of one or more entities in the complex system being managed. The access modules 12 that process such a request generate status information indicating the status of the request, which they return to the functional-access kernel 14.

Alternatively, a request may solicit information as to the status or condition of one or more entities in the system, the entities being identified in the request. In processing such a request, one or more access modules 12 may determine the status or condition of the entities, and return an identification thereof to the functional-access kernel 14. In other cases, information stored in the control arrangement (such as by a historical data recorder functional module) may be used to satisfy the request.

In addition, a request may be of both types, that is, it may change the state or condition of one or more entities, and may also request information as to the states or conditions of the entities after the change. In processing such a request, the access modules 12 cause the change to occur, if possible, and return status information as to the status of the request, as well as information as to the states or conditions of the entities.

Requests may be generated in response to an operator action at a terminal presentation device. In that case, the presentation module 10 controlling the terminal generates a request, which it transmits to the presentation-functional kernel 13. In addition, requests may be generated directly by appropriate functional modules 11. For example, a functional module 11 operating as a historical data recorder may generate requests to periodically determine the status or conditions of the respective entities in the complex system for storage in a historical database for use in later processing if required by an operator.

E. KERNEL

The kernel 13, 14 includes several elements, including an information manager 15, 20 (hereafter referred to simply as information manager 15 or information manager 20, which form one and the same information manager), a dispatcher 16, 21 (hereafter referred to simply as dispatcher 16 or dispatcher 21, which form one and the same dispatcher) and a data storage element 17, 22 (hereafter referred to simply as data storage element 17 or data storage element 22, which form one and the same data storage element, as described below.

F. DATA STORAGE

The data storage element 17, 22 may comprise one or more high speed RAM's containing dispatch data structures, or one or more fixed disk drives or other storage means, according to the types and amount of data stored therein. In addition, data of different types may be stored in various storage means for later use by the kernel, all of these means being represented diagrammatically by the single data storage element 17, 22.

Figure 1B:
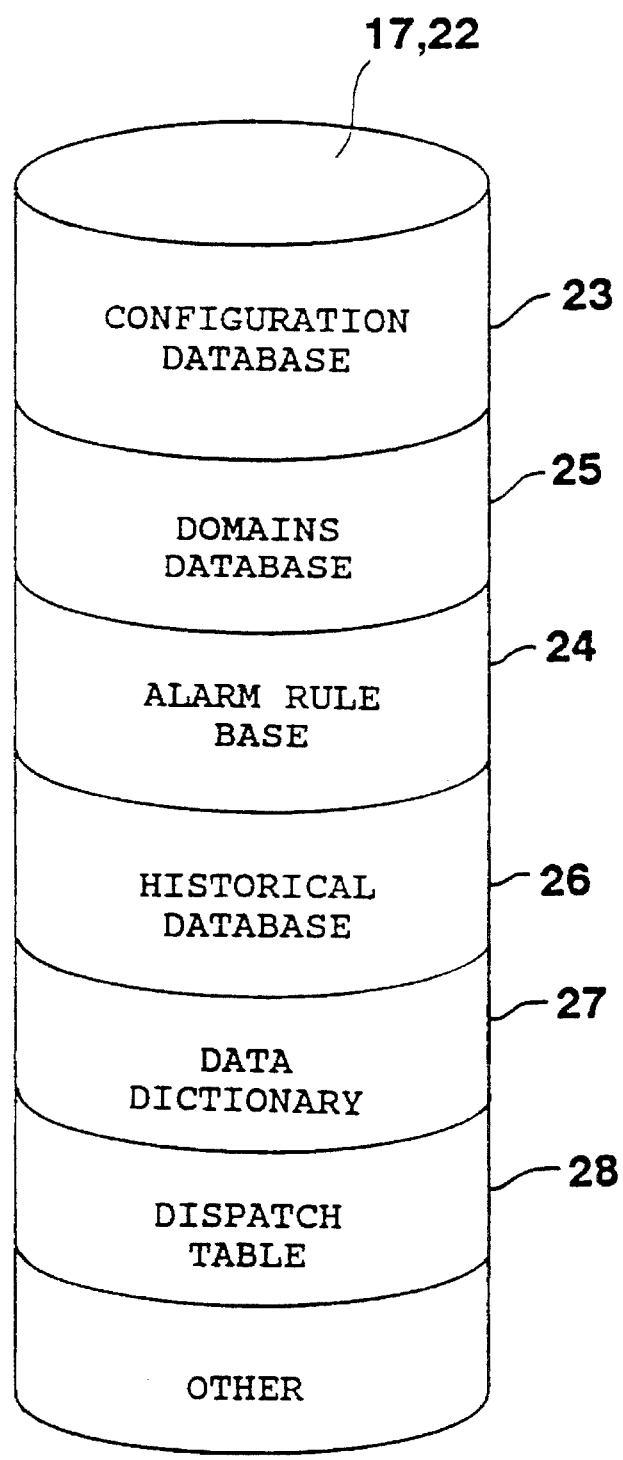
FIG. 1B is a block diagram of the information stored in the storage element of FIG. 1A.

Referring to FIG. 1B, in one embodiment, the data storage element 17, 22 maintains information as to the existence and condition of the various entities comprising a complex system at various points in time, in particular, selected information as to the status and conditions of various entities controlled by the access modules 10 as obtained by the historical data recorder functional module 11. This is stored in a historical database 26.

Other information may also be stored in data storage element 17, 22. In particular, as discussed above, a configuration module may form a configuration database 23 indicating the presence of entity instances in the complex system. A domains module may store a database 25 describing domains of entities for use in limiting the user's scope of control. Alternatively, the domain information may be stored as an element of the configuration database 23. Also, an alarms module may use an alarm rule base 24 to verify alarm conditions within the complex system.

Other information, which relates to the individual modules in the control arrangement may also be maintained in storage element 17, 22. For example, as will be detailed below, a dispatch table 28 for use by the dispatcher 16, 21 may store the locations of the modules and the operations, entities, and attributes which they service. In addition, the control arrangement may maintain a data dictionary 27 storing the attributes, directives and sub-entities of each of the various classes of entities in the complex system. This latter information may be used to, e.g., process requests from the user and/or to create menus to prompt user requests.

G. INFORMATION MANAGER

Referring to FIG. 1A, as described in detail later, if the information manager 15 receives a request from a presentation module 10 to which it can respond using the information in the data storage element 17, it intercepts the request and generates a response to the request, which it transmits to an appropriate presentation module 10 for display to the operator which provided the request. If the information manager 15 is unable to respond to the request, it then determines whether the request relates to the current time or a time in the future; that is, the information manager 15 determines whether the request should be processed immediately or scheduled for a specified time in the future. At the appropriate time, whether immediately or at the scheduled time, the information manager 15 transfers the request to the dispatcher 16. From the nature of the request, the dispatcher 16 identifies a functional module 11 to process the request, and transfers the request to that functional module 11.

In response to the receipt of a request from the dispatcher 16, the functional module 11 proceeds to process the request. It may, in response to the request, initiate one or more operations, each represented by a request, hereafter called a subordinate request, which it directs to another functional module 11 or to the functional-access kernel 14. Upon receiving responses to all of the subordinate requests, the functional module 11 generates a response which it transmits to the dispatcher 16. The dispatcher 16 then formulates a response that it transmits, through the information manager 15, to the appropriate presentation module 10 for display to an operator.

The functional-access aspect of kernel 14 includes the information manager 20, the dispatcher 21 and the data storage element 22. A subordinate request from a function module 11, directed to the function-access kernel 14, is received initially by the information manager 20. The data storage element 22 also contains information, as provided by the historical data recorder functional module 11, as to the condition of the complex system at various points in time, in particular, selected information as to the status and conditions of the various entities controlled by the access modules 10.

If the information manager 20 receives a subordinate request from a function module 11 to which it can respond using the information in the data storage element 22, it intercepts the request and generates a response to the subordinate request, which it transmits to the function module 11 from which it received the subordinate request. If the information manager 20 is unable to respond to a subordinate request from a functional module 11, it then determines whether the request relates to the current time or a time in the future; that is, the information manager 20 determines whether the request should be processed immediately or scheduled for a specified time in the future. At the appropriate time, whether immediately or at the scheduled time, the information manager 20 transfers the subordinate request to the dispatcher 21. In response to the receipt of a subordinate request from the information manager 20, the dispatcher 21 identifies an access module 12 to process the subordinate request and transfers the subordinate request to that access module 12.

In response to the receipt of a subordinate request from the dispatcher 21, the access module 12 proceeds to process the request. It may, in response to the subordinate request, initiate one or more operations in connection with the entity of the complex system controlled thereby. If the subordinate request requires the access module 12 to change the state or condition of the entity, it attempts to do so and generates a response containing status information indicating the status of the attempt, that is, for example, whether the change was successful, unsuccessful, or partially successful. On the other hand, if the subordinate request requires the access module 12 to identify the state or condition of the entity, it generates a response indicating the entity's state or condition. Finally, if the subordinate request requires the access module 12 to do both, it attempts to change the state or condition of the entity and generates a response indicating the status of the attempt and also the entity's new state or condition. In any case, the access module 12 transmits the response to the dispatcher 21, which transfers it to the functional module 11 which generated the request. The functional module 11 uses the response from the access module 12 in formulating its response to a request from the dispatcher 16 or to a subordinate request from another functional module 11, as appropriate.

A functional module 11, upon receiving a subordinate request from other functional modules 11, processes it in the same manner as it processes a request from the dispatcher 21.

H. ADVANTAGES

The control arrangement depicted in FIG. 1A provides a number of advantages. The control arrangement essentially forms a processing chain, with each element along the chain attempting to process a request before passing it along to the next element. Thus, if the information manager 15, 20 can process the request, based on the contents of associated data storage element 17, 22, without requiring further processing by another element further down the chain, it does so.

Figure 5:
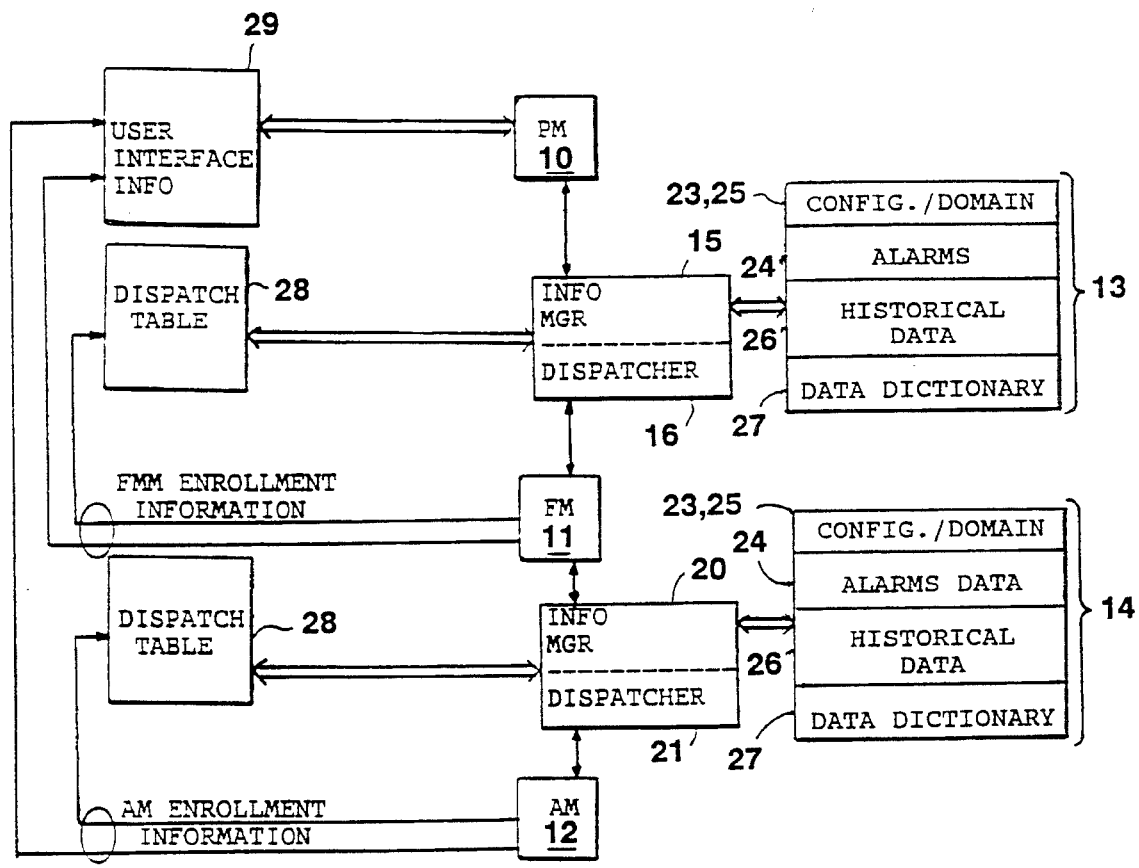
FIGS. 5 and 6 are functional block diagrams depicting various modules and data structures in the control arrangement depicted in FIG. 1A.

Furthermore, the control arrangement is extensible, so that additional presentation modules 10, functional modules 11 and access modules 12 can be easily added, as described below, without changing the architecture of the control arrangement. Addition of functional modules 11 and access modules 12 is by way of an enrollment procedure, which is described below in connection with FIG. 5. Additions or deletions of modules 10, 11 or 12 can be made merely by modifying, as described below, the contents of certain data structures in the data storage element 17, 22, and other data structures maintained by the presentation modules 10, as depicted in FIG. 5.

Additionally, the modular, extensible nature of the control arrangement facilitates management of the control arrangement itself. The same dispatch and request paradigms which are used to issue management directives to the complex system may also be used to issue commands to the management modules themselves. This eliminates the need for an additional management application to manage the control arrangement itself.

Also, as the functions of the modules are specified in a standard format and available to the control arrangement as a whole, the control arrangement can provide full user interface support for the modules, thus freeing module designers from the burden of supporting a user interface to each module. This type of "automatic" user interface support also guarantees a uniform look and feel to the user interface regardless of the source or nature of the management modules being used.

Figure 6:
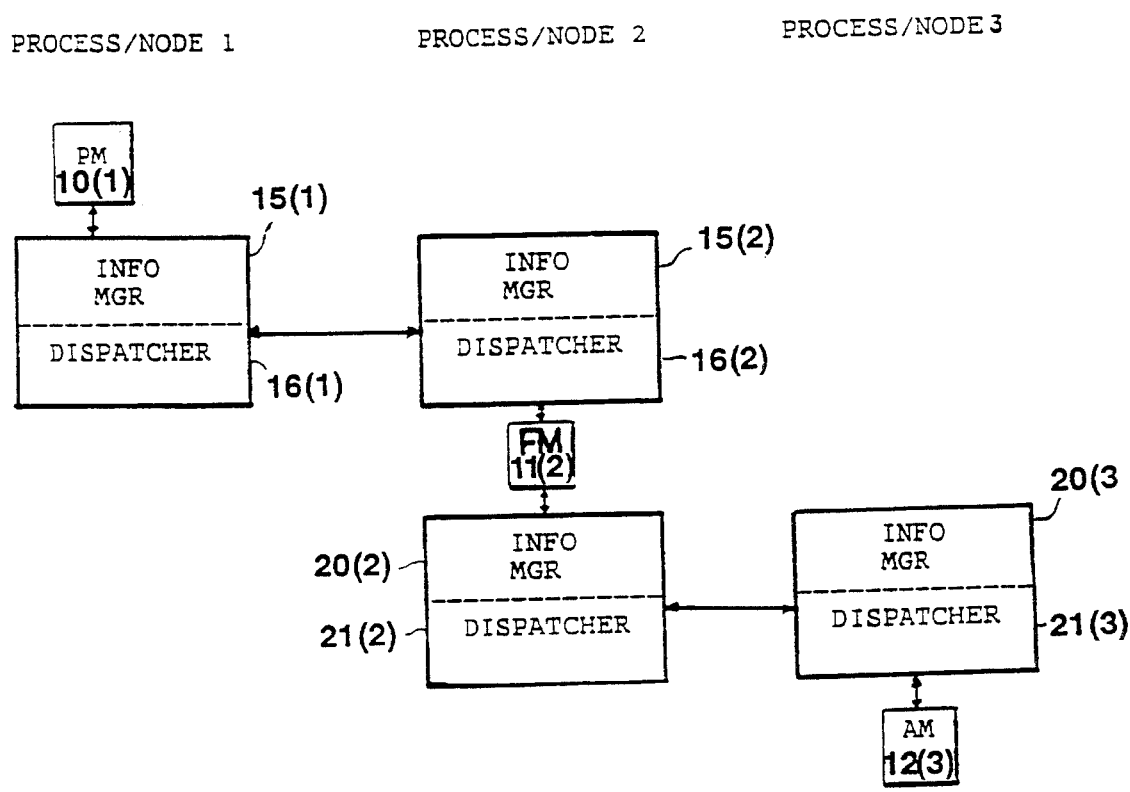

It will be appreciated that, if the control arrangement is used to control a distributed digital data processing system, it, including its various elements, may comprise a plurality of routines processed by the various nodes and computers comprising the distributed digital data processing system; that is, computer facilities, in addition to those comprising the distributed digital data processing system being controlled, are not required to process the modules comprising the control arrangement to control the distributed digital data processing system. Conventional procedure call mechanisms, interprocess communication mechanisms and internodal communications mechanisms may be used to transfer communications, including requests, subsidiary requests and responses, between the various portions of the control arrangement which may reside in different parts of the same process, in different processes in the same node, and in different nodes. If the modules reside in different processes in the same node or in different nodes, interprocess and internode communications mechanisms as depicted in FIG. 6, described below, are used to transfer requests and subsidiary requests, as well as responses, among the various processes and nodes.

I. ENTITY MODEL

Figure 2A:
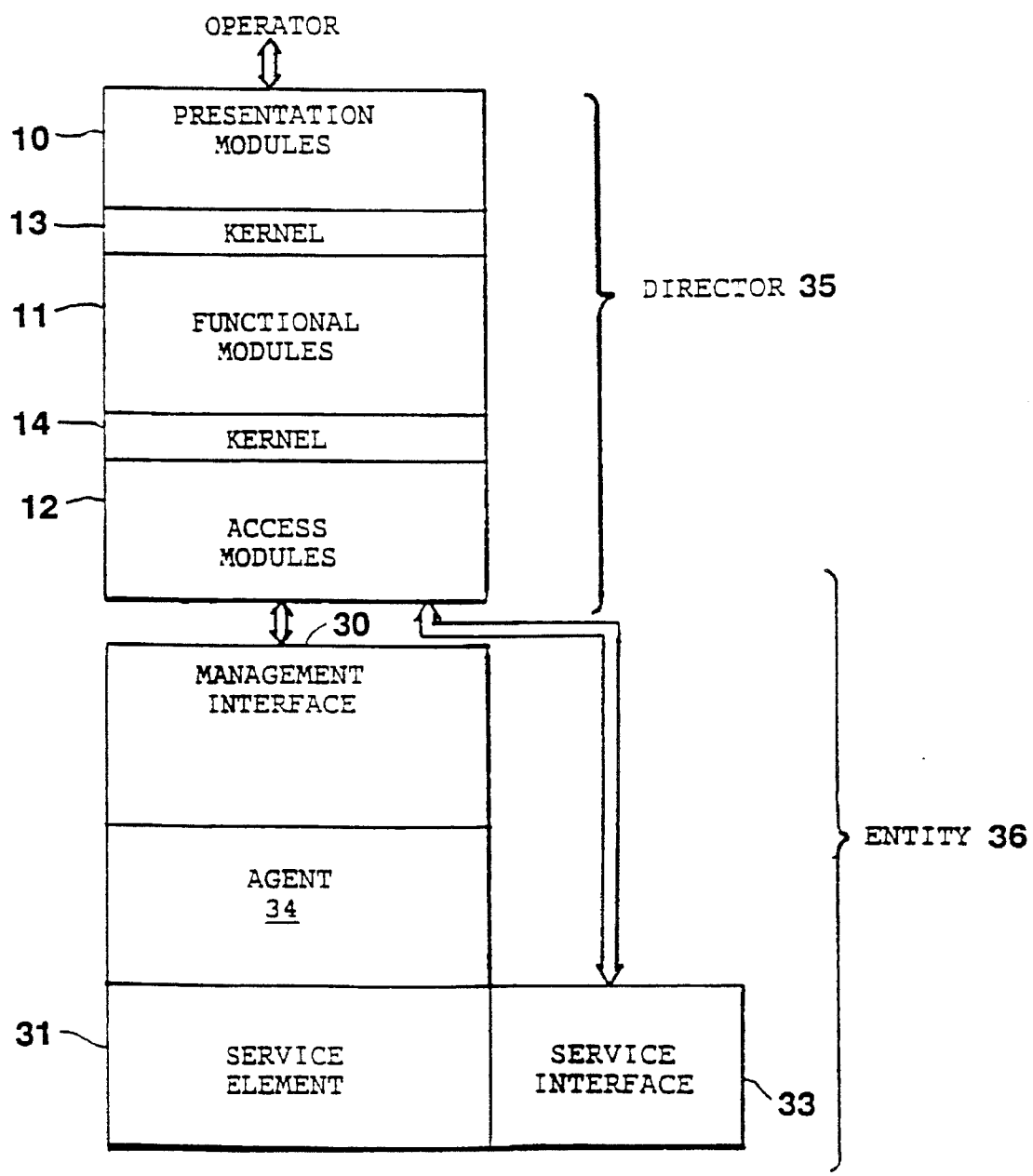
FIG. 2A is a functional block diagram of a portion of the control arrangement depicted in FIG. 1A, particularly defining an entity comprising the control arrangement.

Before proceeding further, it will be helpful to describe further the relationship between the control arrangement depicted in FIG. 1A, and the complex system being controlled. Specifically, referring to FIG. 2A, the control arrangement comprises a director 35, which includes all of the presentation modules 10, the functional modules 11, and the access modules 12, along with the kernel 13, 14. The complex system includes one or more entities 36. Each entity 36 includes a service element 31, a management interface 30 and a service interface 33. The management interface controls and monitors the service element through an agent 34. The service element is the actual managed portion of the entity 36 and provides the entity's primary function or function. That is, the service element 31 performs the function of the entity required within the context of the distributed digital data processing system. If, for example, the entity performs communications over a network for a node, the service element 31 performs the communications.

As noted above, the service element 31 is managed through an agent, which communicates with the director, specifically, with the access modules 12, through the management interface 30 and the service interface 33. The communications through the management interface 30 facilitates turning the service element 31 on or off and its initialization, and also permits the director 35 to determine the operational status of the entity 36. Communications through the service interface 33 permits the director 35 to control and monitor service element 31 otherwise, by, for example, establishing conditions of selected attributes, such as communications parameters in the case of an entity 36 which performs communications, in context of controlling the entity 36, or determining the values of counters, in the context of monitoring the entity 36.

The management of an entity is characterized by the directives it supports, and its attributes, which are, broadly, those parameters which relate to its functioning and control and are associated with directives. For example, if the entity is a router which communicates data packets through a distributed data processing network, the attributes of the router may include the number of packets transmitted, and the number of bytes transmitted. If the entity is a modem, the attributes may include the counters and status registers which relate to the modem operation. Examples of directives include SHOW, which will retrieve attribute values, and SET, which modifies attribute values.

The service interface relates to the function of the entity, and the management interface relates to operation of the agent. The directives and attributes which are accessed through the service interface characterize the function of the entity, whereas the directives and attributes which are accessed through the management interface characterize the control and monitoring of the entity.

To clarify the roles of the two interfaces, and to provide an example of how the above model applies to a particular entity, consider a controllable entity which is a modem. The modem may have several functional attributes, such as the baud rate, line selection, and power switch setting. In addition, the modem may have several management attributes, such as its the percent utilization of its lines and the time elapsed since the last self-test. The baud rate, line selection, and power switch setting relate to the immediate operation of the modem, and as such would be accessed through the service interface. The percent line utilization and time elapsed since the last self-test to the general operation of the modem, and as such would be accessed through the management interface.

To elaborate on the above example, note that the presentation modules, during presentation of management information on a presentation device, use the service interface of the presentation device, because the presentation of information is the main service of the presentation device. However, an access module in the control arrangement may also manage the presentation device, for example by polling it to determine if it is turned on.

In addition to the attributes discussed above, there are other "pseudo-attributes" which relate to the entity but are not stored by the entity as such. Pseudo-attributes generally are attributes which are required by the entity model description but not supplied by the entity. An example is the attribute IMPLEMENTATION, which may be the synthesis of the attributes IMPLEMENTATION TYPE and VERSION supplied by the entity, and the CREATION TIME of the entity. Pseudo-attributes are maintained by the access module which is responsible for accessing the entity.

It is worth noting at this point that the entity model is a generalized method for describing directives and attributes of an entity, and does not imply any structure within the entity itself. The entity model is a tool which allows the control arrangement to refer to the operations and attributes of any arbitrary entity in a consistent fashion. Any arbitrary entity may be "plugged into" and managed by the control arrangement of FIG. 1A by (1) describing it consistent with the entity model, (2) implementing an appropriate access module, and (3) plugging (enrolling) the access module into the control arrangement.

J. MANAGEMENT OF MANAGEMENT MODULES

As noted above, in a control arrangement which controls a distributed digital data processing system, the various presentation modules 10, functional modules 11, access modules 12 and kernel 13, 14 are processed by the various nodes comprising the distributed digital data processing system. In that case, the various modules 10, 11 and 12 and kernel 13, 14 form entities in the complex system, and may be controlled in the same manner as other entities, as described above.

The dispatch and request paradigms which are used to issue management directives to the complex system are also used to issue commands to the management modules themselves. As will be seen in the dispatch specifications below, in addition to management routines for managing the complex system, each module contains self-management routines which manipulate the internal attributes of the module. Both the external and internal routines may be accessed by requests using the request syntax. Therefore, as the capabilities for management of the complex system are increased by addition of new control modules, the capabilities for management of the control arrangement are similarly increased.

SPECIFIC DESCRIPTION

A. MANAGEMENT MODULE STRUCTURE

1. Overview

Figure 2B:
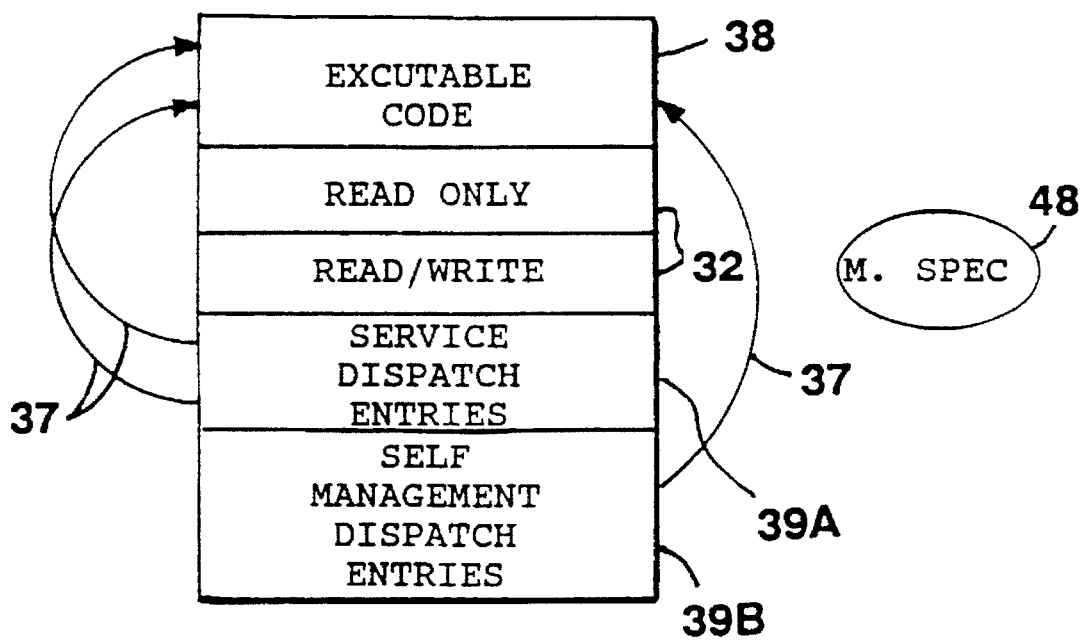
FIG. 2B illustrates the structure of a management module.

Referring to FIG. 2B, in one particular embodiment, the structure of a management module includes executable code 38 that implements the management functions provided by the module. In particular, for an access module, the executable code includes the access protocols for the entity classes which are serviced by the access module. For a functional module, the executable code includes instructions for computing the higher-level functions provided by the module. For a presentation module, the executable code includes the interface protocols for the presentation devices supported by the presentation module.

The module may require private memory to store various read-only or read/write variables relating to the module's function. This storage is provided to the module as an allocated region 32. This storage may be used, for example, by a presentation module to store parse tables or presentation forms data, or by an access module to store password information in a wildcarded request (see below).

The access points of the various procedures provided by the access modules are indicated by pointers in the dispatch entries 39A and 39B. As will be more fully discussed later, the dispatch entries are merged into the dispatch table stored in the kernel storage 17, 22, and are used to locate the various procedures which the module supports. As shown in FIG. 2B, dispatch pointers 39A relate to the procedures in the module which provide management services to the complex system, whereas dispatch pointers 39B relate to the procedures in the module which provide management services to the module itself. As discussed above, when the module is enrolled into the control arrangement both sets of pointers are loaded into the kernel memory for use in managing the complex system or the modules which comprise the control arrangement.

In addition to the above structure, the module is associated with a management specification 48 which describes the classes of entities and attributes which are serviced by the module, as well as the directive and response structure for requesting services from the module. The management specification also specifies the management of the module itself. During the enrollment of a module, the related management specification is loaded into the data dictionary.

2. Management Specification

Figure 3E:
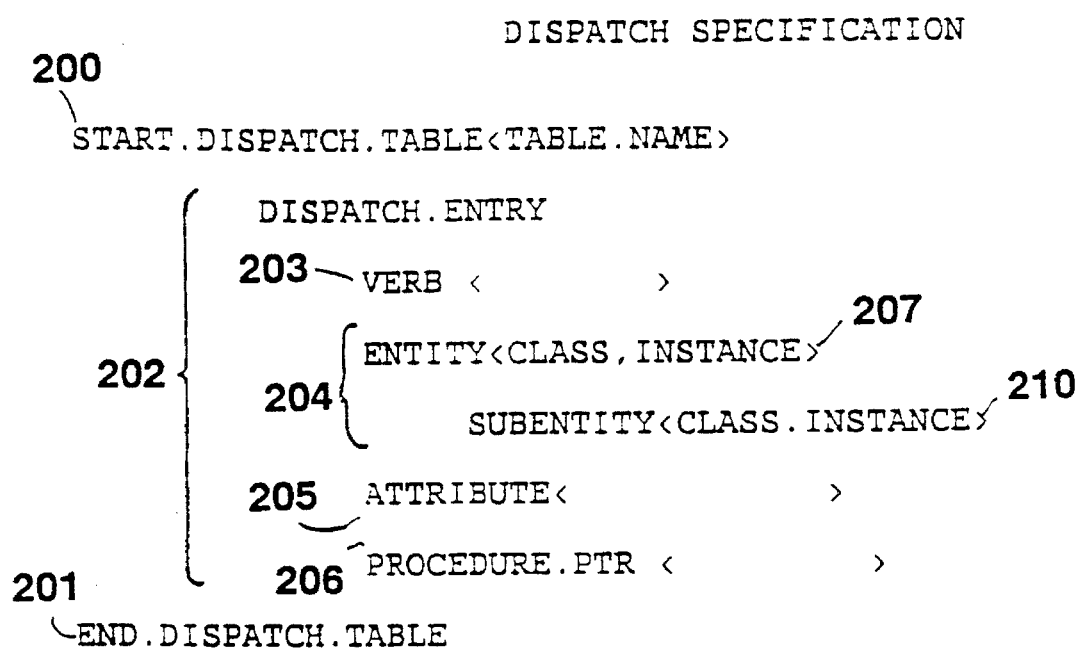
FIGS. 3A through 3D define the management specifications defining the management view provided by functional modules and access modules comprising the control arrangement depicted in FIG. 1A, and FIG. 3E defines the dispatch specifications for the functional modules and access modules.

The properties, composition and structure of the service element 31 and service interface 33 of the entities of the complex system being managed by the control arrangement (FIG. 1A), as well as the various entities comprising the control arrangement, are defined by a management specification and dispatch specification. FIGS. 3A through 3D detail the management specification for an entity, and FIG. 3E defines a dispatch specification which is used in initiating a particular operation in connection with the entity. With reference initially to FIG. 3A, the management specification for an entity includes a header portion 40 and a body portion 45. The header portion 40 includes certain identification information such as a name field 41 which contains a name that identifies the entity, a version field 42 which contains a version identification, a facility field 43 containing location information indicating the location of the entity within the complex system (for example, the identification of the node if the complex system is a distributed digital data processing system), and a type declaration field 44 which indicates selected data type information.

In an alternative embodiment, the header portion may also include a symbol-prefix field which is used in conjunction with the symbol field 52, discussed below.

The body portion 45 of the management specification contains the actual management specification for the entity. The body portion 45 is further defined in FIG. 3A. Preliminarily, the control arrangement includes two general types of entities, namely, a global entity, and a subordinate entity. The control arrangement facilitates a hierarchy of entities, as defined above, with the global entity identifying a top level entity in a hierarchy and a subordinate entity identifying a entity that is subordinate to another entity in the hierarchy. The body portion 45 of a management specification includes one of two types of entity definitions, that is, a definition 45A to a global entity or a definition 45C to a subordinate entity.

A management module may provide services to a global class of entities, or to a class of subentities within a global entity class. A particular example occurs in the DECnet Phase IV, as promulgated by Digital Equipment Corporation, Maynard, Mass.; in DECnet Phase IV, Adjacent_Node is a subordinate entity class, whose superior entity class is Node4_Circuit. If a management module provides services specifically to the Adjacent_ Node subordinate entity class, the management specification must provide a mechanism to indicate that the management specification for the global class resides in the management specification for another module (that which manages the Node4_Circuit class).

The definitions 45A and 45C to a global and subordinate entity, respectively, are further defined in FIGS. 3A through 3D. An entity definition 4.6 includes a name field 47 that includes a name and a code by which the entity can be identified. In addition, the name field 47 identifies the entity as a global or subordinate entity and identifies a class name for the entity. If the entity definition is for a subordinate entity, it has a superior field 50 which identifies the superior entities in the hierarchy. An identifier field 51 includes a list of attribute names for attributes which are defined later in an entity body portion 53. Finally, a symbol field 52 includes a symbol that is used to generate a specific compiler constants file which contains consistent names for use by an entity developer.

In an alternative embodiment, a DYNAMIC field may be included in the entity definition. This field may have the values TRUE or FALSE, and indicates whether the management specification for the entity should be stored in the configuration database (FIG. 1B). This provides the management module developer a way to indicate precisely which subordinate entity instances are to be stored in the configuration database. In this way, entities such as connections between nodes which are highly dynamic do not need to be stored in the configuration of the system. This eliminates the overhead caused by repeatedly adding and deleting dynamic instances. The boolean value of the DYNAMIC field indicates if the entity class is dynamic in nature; if TRUE, instances of the entity class will not be stored in the configuration, if FALSE, instances of the entity class will be stored in the configuration.

As noted above, an entity definition 46 for an entity includes a body portion 53. The body portion 53 is defined in detail in FIG. 3B. With reference to FIG. 3B, the body portion 53 of a management specification includes four portions, namely, an attribute partition definition list 54, an aggregation definition list 55, a directive definition list 56 and a subordinate entity list 57, if the entity class contains any subordinate entities. If the body portion 53 includes a subordinate entity list 57, each item in the subordinate entity list 57 comprises an entity definition 46 (FIG. 3A), with the name field 47 including "SUBORDINATE".

As mentioned above, the entity body contains an attribute partition list 54 and an attribute aggregation list 55. It is useful at this point to explain the distinction between these lists. Each list takes the entity's full set of attributes and associates each attribute with one or more groups; the groupings set forth by the partition list 54 are independent from those set forth by the aggregation list—each list is an independent characterization of the entity's attributes.

The partition list 54 identifies and groups all attributes having similar form; for example, an attribute partition may include all counters or all status attributes (flags). The word "partition" is used to indicate that the groups formed by attribute partitions are true partitions of the attributes no attribute may be a member of two partitions, and each attribute must be a member of exactly one partition.

The aggregation list 55 identifies and groups all attributes having similar function. For example, an access module for a NODE4 global entity class may define an attribute aggregation called "SQUERGE". The SQUERGE attribute aggregation may include all attributes relating to the current operational performance of a NODE4 class entity, e.g., a counter type attribute indicating the number of bytes sent, and characteristic type attribute indicating the pipeline quota. In this example, a user could then view these statistics together by a command such as:

SHOW NODE<instance>ALL SQUERGE

The word "aggregation" is used to indicate that aggregations contain attributes with like function, but do not necessarily form partitions of the attributes. One attribute may be a member of more than one aggregation, and all attributes do not need to be a member of an aggregation.

The attribute partition definition list 54 includes one or more attribute definitions 64 as further defined on FIG. 3B. Each attribute partition definition 64 includes a kind field 56 which identifies the attribute as being of a particular type, including an identifier type attribute, a status type attribute, a counter type attribute, a characteristic type attribute, a reference type attribute or a statistic type attribute. For each type of attribute, the data type is provided by an appended field 68. The attribute partition definition 54 may also include fields 60 and 61 which indicate, respectively, a default polling rate and a maximum polling rate for the entity. As noted above, a historical data recorder functional module 11 may periodically obtain status and condition information for storage in the data storage element 17, 22 in connection with the various entities comprising the complex system. The contents of the polling rate fields identify the default and maximum rates at which the respective entities will provide status and condition information. In addition, an attribute definition includes one or more attribute fields 62 each including an attribute name 63, which includes a code by which the attribute may be accessed, and an associated attribute body 64.

All definitions for attributes which are members of a partition reside within one partition definition 54 as set forth above. The independent aspects of the attributes are set forth by one of more attribute body definitions 64. FIG. 3B further describes the information contained in an attribute body 64 in an attribute field in an attribute partition definition 55. An attribute body 64 may include a number of fields, including an access information field 65 which indicates whether the attribute can be read or written and a display field 66 which indicates whether the attribute should be displayed to an operator, by means of a presentation module 10. A default value field 67 identifies a default or initial value for the attribute. A symbol field 70 contains a symbol that is used to generate a specific compiler constants file which contains consistent names for use by an entity developer.

An attribute body 64 further includes a categories field 71 which identifies one or more categories with which the attribute may be associated. If the complex system is a distributed digital data processing system, the categories may include but need not be restricted to categories defined by the 74-98-4 Open Systems Interconnect (OSI) standard, including CONFIGURATION, FAULT, PERFORMANCE, SECURITY or ACCOUNTING. In addition,-the attribute body 64 may include polling rate information in fields 72 and 73 if the polling rates for the particular attribute defined by the attribute body 64 are different than the polling rates defined in fields 60 and 61 in the attribute partition definition 54. Finally, the attribute body 64 may include a private variable field 74 which identifies private variables that are used in the management module in processing relating to the attribute.

In an alternative embodiment, the polling rate information may be omitted entirely from the attribute definitions, owing to the implementation-specific nature of this data. In addition, in alternative embodiments, a UNITS field may be included in the attribute body 64. Where a UNITS field is included, numeric data types can (and should) have their units defined.

Attributes can be aggregated to simplify management of the complex system. The aggregation definition portion 55 of the entity body 53 identifies one or more aggregations which the entity includes. The contents of an aggregation definition portion 55 are defined in detail on FIG. 3B. An aggregation definition portion 55 includes an aggregation name field 75 which identifies the aggregation and an attribute list 81 identifying the attributes included in the aggregation. An aggregation definition portion 55 may also include a list of directives, that is, requests which may be processed by reference to the aggregation. An aggregation definition portion 55 may include a symbol field 77 similar to the symbol field described above, a categories field 80 that may contain but is not limited to OSI category information, and a private variables field 82 that identifies private variables used in processing relating to the attributes included in the aggregation identified by the aggregation name in field 75.

An entity processes directives which are generated by the control arrangement in response to the requests and subordinate requests from a presentation module 10 and a functional module 11, respectively. Each directive includes a directive request, which defines an operation to be performed, and may include a response and an exception which define responses that the entity may make in connection with the operation. Each directive is defined by a directive definition 56. FIGS. 3C and 3D detail the structures of a directive definition 56. With reference to FIG. 3C, a directive definition 56 includes a name field 83, which includes a code by which the directive can be identified and accessed. A directive includes a request definition field 90, which identifies the structure of a request or subordinate request, a response definition field 91 which defines the structure of a response, and an exception definition field 92 which defines the structure of an exception which may be generated during processing of the directive. The details of the fields 90, 91 and 92 will be described below.

A directive definition 56 may also include a field 84 which indicates whether the directive is an action directive, that is, whether it enables a change in the condition or status of one or more entities in the complex system, or whether it merely initiates return of status or condition information. In an alternative embodiment, the action field 84 may be replaced by a DIRECTIVE_ TYPE field which indicates whether the directive is of the EXAMINE, MODIFY, or ACTION type. An EXAMINE directive operates on attributes only and does not modify; examples include SHOW or DIRECTORY directives. A MODIFY directive operates on attributes only and does modify; examples include SET, ADD, or REMOVE directives. An ACTION directive does not operate on attributes, rather, ACTION directives operate on the entity itself; examples include CREATE and TEST directives.

A field 85 may be provided to indicate whether the direction is accessible by a presentation module 10. An identifying text string may be provided in a symbol field 86. In addition, a categories field 87 may define, but need not be limited to, one or more OSI categories, as defined above in connection with field 71 (FIG. 3B).

The structure of the request definition field 90 in a directive definition 56 is defined in FIG. 3C. In addition to the word "REQUEST", the request definition field 90 may include zero or more arguments 91, each identified by a name field 92 including an access code. In addition, an argument may include a display field 93 that indicates whether the argument is to be displayed by a presentation module 10 to an operator. The argument may also include field 94 which indicates whether an operator must provide a value for the argument, a default field 96 including a default value, a symbol field 97 including an identifying text string, and a units field 95 which identifies the units of measurement of the argument values. In addition, the argument 91 may include a private variable field 100 identifying the private variables used in processing in connection with the argument.

The structures of a response definition field 91 and an exception definition field 92 are depicted in FIG. 3D. With reference to FIG. 3D, a response definition field 91 includes a response name field 101, which also includes a code by which the response can be accessed. A severity field identifies whether the response indicates SUCCESS in performing the request defined by the request field 90, or whether the response is INFORMATIONAL. A text field 103 indicates a text string which the presentation module 10 can display to an operator to indicate the response. In addition, a response definition field can include one or more argument fields 104, each including a name field 105, a units field 106 and a symbol field 107.

In alternative embodiments, the SEVERITY field 102 may be replaced with a SYMBOL field containing an identifying text string for the response, and the ARGUMENTS field 104 may include a boolean DISPLAY field for indicating whether the response should be displayed to the user.

The structure of the exception definition field 92 is similar to that of the response definition field 91, including fields 111 through 117, which are similar to fields 101 through 107 of the response definition field 21. The severity field 112, however, can contain three values, including WARNING, ERROR and FATAL, indicating the severity of the error giving rise to the exception.

As in the response definition 91, in alternative embodiments, the SEVERITY field 112 may be replaced with a SYMBOL field containing an identifying text string for the response, and the ARGUMENTS field 114 may include a boolean DISPLAY field for indicating whether the response should be displayed to the user.

3. Dispatch Specification

FIG. 3E defines a dispatch specification 39A (FIG. 2B) which is used in defining initiation of particular operations by an entity. The information in the dispatch specifications for an entity are used to generate pointers to procedures to perform the operations. With reference to FIG. 3E, the dispatch specification includes a header 200 which defines the beginning of the dispatch specification and contains a table name, and a footer 201 that defines the end of the dispatch specification. Between the header 200 and footer 201, the dispatch specification includes one or more dispatch entries 202 each of which defines an operation in connection with one or more entities and attributes.

The dispatch entry includes a verb portion 203 and an entity entry 204, which together identify an operation. Effectively, the verb portion 203 and the entity portion 204 of the dispatch entry corresponds to a directive defined by the management. Directives may either operate on entities, or on attributes defined by an attribute portion 205 of the entity defined by an entity entry 204. The contents of the entity entry 204 correspond to an entity or sub-entity identified by an entity class and instance name in the name fields 47 and 50 of the entity definition 46. Similarly, the contents of the attribute portion 205 correspond to attributes that are defined by the name field 62 of the attribute definitions 54 of the entity body 53 of the entity definition 46.

The dispatch entry 202 also includes a procedure pointer portion 206, which contains a pointer to an entry point to a procedure in an access module which processes a directive in connection with the entity and attributes identified in portions 203, 204 and 205 of the dispatch entry 202. As will be described below in connection with FIGS. 5, 7A and 8B, the dispatch specification is used in formulating data structures, specifically dispatch entries 134 (FIG. 8B) of dispatch tables 28 (FIG. 5) that are used by the kernel 13, 14 to transfer requests to the proper functional module 11 or access module 12 for processing. A request or subsidiary request essentially defines a verb, an entity and an attribute partition, and the kernel compares the verb, entity and attribute partition defined by a request to the contents of the portions of the data structures defined by portions 203, 204 and 205, respectively, of the dispatch specification. If the respective portions of the verb match the contents of the corresponding portions of the data structures (FIG. 8B), the kernel 13, 14 initiates the procedure defined in the dispatch entry 134, which is taken from the portion 206 of the dispatch specification (FIG. 3E)

B. DATA FILES AND USE

1. Data Dictionary

Figure 4:
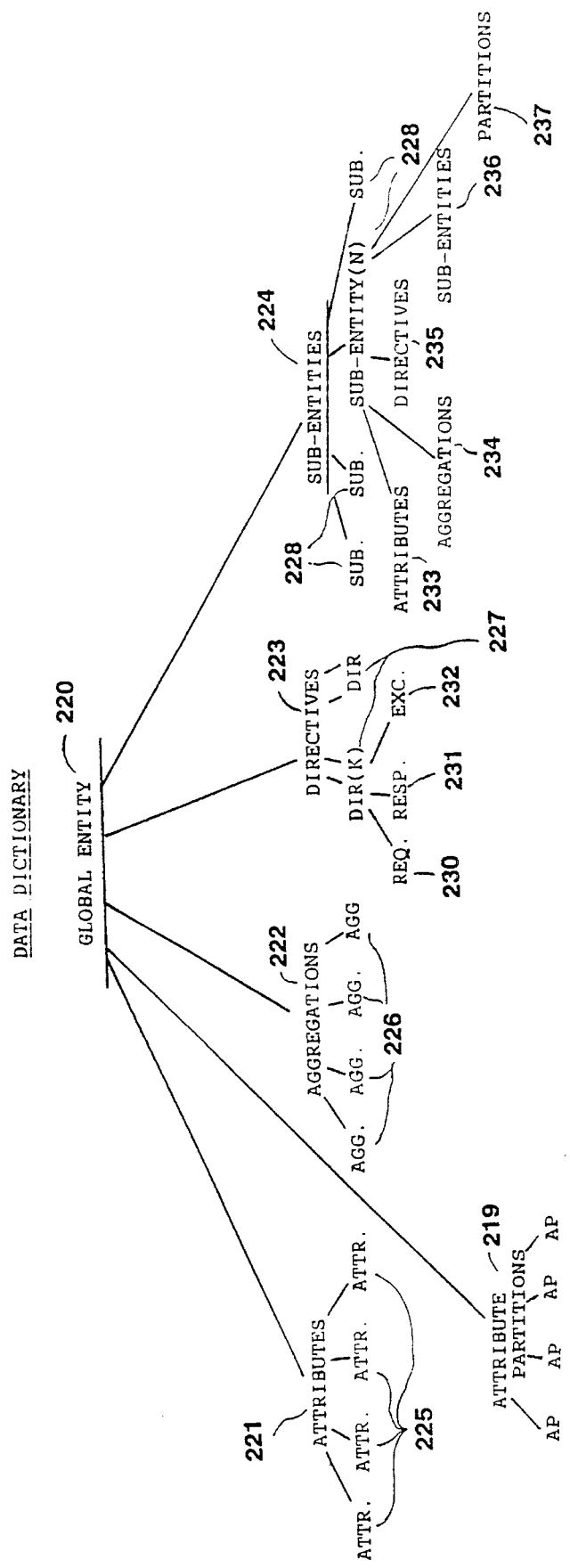
FIG. 4 depicts the structure of a data dictionary which includes information defined by the management specifications shown in FIGS. 3A through 3D.

When a management module is enrolled, its management specification may define new global entity classes, subentity classes or attributes, directives or events of global or subentities. The management specification (FIGS. 3A through 3D) is used to construct a data dictionary, which, in turn, is used in constructing other data structures, which are described below in connection with FIGS. 5, 8A and used as depicted in FIG. 9. The data dictionary comprises a hierarchical database having the general schema or structure shown in FIG. 4. With reference to FIG. 4, the schema has a relative root node 220 which is associated with a global entity as defined in the management specification (FIG. 3A). The global entity node points to a plurality of subsidiary nodes in the hierarchical schema, including a subsidiary node 221 listing all attributes, subsidiary node 219 listing attribute partitions, a subsidiary node 222 listing attribute aggregations, a subsidiary node 223 listing directives, and a subsidiary node 224 listing subentities, of the entity body 53 in the entity definition 46 of the management specification.

Each of the subsidiary nodes 219 through 224, in turn, points to the respective elements defined in the entity body. That is, the attribute node 221 points to attribute definition nodes 225 each of which contains the definition of an attribute defined in an attribute definition 54 in the entity body 53, the attribute partition node 219 points to attribute partition nodes each of which contains an attribute partition defined in a partition definition 56 in the attribute definition 54 of the entity body 53, the aggregations node 222 points to aggregation definition nodes 226 each containing the definition of an aggregation defined in an aggregation definition 55 in the entity body 53, the directives node 223 points to directive definition nodes 227 each containing the definition of a directive defined in directive definition 56 in the entity body 53, and the subentities node 224 points to subentities definition nodes 228 each containing the definition of a subentity defined in a subentity definition 57 in the entity body 53. Each of the directive nodes 227, in turn, points to a request node 230, a response node 231 and an exception node 232, each of which, in turn, contains the definition of a request, response and exception as taken from the request definition 90, response definition 91 and exception definition 92 (FIG. 3C) of the management specification. In addition, each subentity node 228 forms the root node of a sub-schema having a structure similar to that depicted for a global entity shown in FIG. 4, including a subsidiary node 233 for attributes, a subsidiary node 234 for aggregations, a subsidiary node 235 for directives, a subsidiary node 237 for partitions and a subsidiary node 236 for subentities. The schema depicted in FIG. 4 is repeated for all subentities and their subentities as defined in the management specification depicted in FIGS. 3A through 3D.

The information in the management specification is merged into the respective nodes of the data dictionary and is used to create the user interface information file 29 used by a presentation module 10 in connection with display of entity information, including entity identification information and response information, to an operator and generation of requests for processing by the other portions of the control arrangement and the entities of the complex system, as described below. The diverse nodes of the data dictionary receive the information from the elements of the management specification to form the complete database comprising the data dictionary. The information in the dispatch specification (FIG. 3E) is used to create the dispatch tables 28, as described below in connection with FIGS. 8B and 9.

With this background, FIG. 5 depicts a single presentation module 10, functional module 11 and access module 12, the kernel 13, 14 including information manager 15, 20 and dispatcher 16, 21. In addition, FIG. 5 depicts various portions of the data storage element 17, 22. Specifically, the data storage element 17, 22 includes a configuration and domains database 23, 25, an alarms database 24, a historical data file 26, a data dictionary 27 and a dispatch table 28.

2. Historical Data File

The historical data file 26 contains information regarding the status and condition of entities, in the case of the presentation-functional aspect of kernel 13, and entities, in the case of the functional-access aspect of kernel 14. In file 26 the status and condition information also includes timing information, to identify the time at which the status and condition information was generated. When the information manager 15, 20 receives a request, or a subordinate request, regarding status or condition at a specific time, it determines whether the information is in the file 26, if the time indicated in the request or subordinate request is in the past, and responds using the contents of the file.

On the other hand, if the time indicated in the request or subordinate request is a future time, the information manager 15, 20 effectively schedules the request to be processed at the time indicated. That is, the information manager retains the request or subordinate request until the indicated time is reached, and at that point processes the request either using responses directly from the access module 12 or functional module 11, as appropriate, or using the contents of file 26 as appropriate.

These functions will be fully described below under the heading "Scheduling".

3. Dispatch Table

The dispatch table 28 is used by dispatcher 16, 21 to determine how to transfer a request or subordinate request to the appropriate functional module 11 or access module 12. The contents of the dispatch table 28 identify the locations, in the distributed digital data processing system, of the entry points of the routines comprising each of the functional modules 11 which may be called in response to requests from a presentation module 10. More specifically, the dispatch table 28 contains calling information which facilitate initiation of the various operations by the respective functional modules 11. Similarly, the contents of the dispatch table 28 identify the locations, in the distributed digital data processing system, of the entry points of the routines in the access modules 12 which are used to process subordinate requests from a functional module 11, that is, the calling information defining the various operations by the respective entities.

4. User Interface Information

The control arrangement further includes a user interface information file 29 that contains information as to the various functions provided by the functional modules 11 and the entities controlled by the access modules 12. The user interface information file 29 contains information derived from the management specifications of the respective entities. The presentation modules 10 use the contents of the user interface information file 29 in displaying menus and other objects on the operators' terminals to facilitate control of the complex system. The information in the user interface information file 29 facilitates display of the various functions and operations in connection with the complex system's entities.

5. Configuration Database

As discussed above, a configuration functional module may create and maintain a configuration database, which lists all of the entity instances in the current configuration of the complex system (and also past configurations, if desired). This information may be used, e.g., by a presentation module to create parse tables or user menus listing available entity instances. The configuration database may also include a domain database for limiting the scope of control of a user, to facilitate use of the complex system, as discussed below.

In addition to the above features, in one embodiment, the configuration database may be used in conjunction with presentation modules to support wildcarding in user commands. When a user command containing a wildcard is received by a presentation module, the presentation module issues a request to the configuration functional module, requesting an enumeration of all entities in the configuration that match the wildcard request. The configuration functional modules then uses the information in the configuration database (along with domain information) to produce the list. After receiving the list, the presentation module expands the user request into all of the possible subsidiary requests which match the wildcarding.

For example, the request

SHOW NODE*IN DOMAIN SITE1

(where SHOW is the directive, DOMAIN is the domain entity class, SITE1 is a domain instance, NODE is a global entity class, and * is the wildcard) would be interpreted as a command to show all instances of nodes within the domain named SITE1. The presentation module would thus expand the request into several requests, each of the form SHOW NODE<instance>

(where <instance> is the instance name), one corresponding to each instance of the NODE class in domain SITE1.

Partial Wildcarding may also be supported. In this case, the group of target entities with instance names that match the pattern specified by the partial wildcarded name are issued directives. For example, "NODE , OO" would match "NODE FOO" and "NODE MAGOO", but not "NODE BAR". Partial wildcarding may not be used in fields having identifiers with certain datatypes, e.g., identifiers which do not use text or digit strings.

In preferred embodiments, wildcard expansion is not allowed in the global entity class field of a user directive. Global class specifications are not wildcarded because doing so would result in insufficient control on the scope of a command. This may create errors if directive names supported by one entity class are not supported by another. Even where a directive name is supported by multiple classes, the directive name may correspond to unrelated functions in different classes, causing undesired side-effects (e.g. a "DELETE *" directive). In addition, global entity wildcarding may simply produce more information than the user intends (e.g. a "SHOW *" directive). Note that wildcarding may be safely allowed in subentity classes.

Embodiments of wildcarding may also delegate some or all of the wildcard expansion duties to access modules. This is particularly the case where no configuration functional module is used. In the absence of a configuration functional module, the access modules (ordinarily associated with accessing all modules of a class or subclass) may store instance data as part of their private storage 32 (FIG. 2B). In this case, the access modules would use the instance data to expand wildcards in received requests. If wildcarding is not supported by a particular access module, an exception indicating this condition would be returned to the user.

C. DATA FILE MANAGEMENT AND ENROLLMENT

When a management module is added to the control arrangement, or when new information relating to management of the entities becomes available, the control arrangement must adapt. The control arrangement is data driven, and thus adapting the system to new modules or information involves modification of the relevant data files. In general, this process is known as data file management. The particular procedure by which the control arrangement adapts to a new module is known as enrollment.

1. Historical Data File Management

In one specific embodiment, the contents of the historical data file 26 are provided and maintained in part by a functional module 11 which serves as a historical data recorder functional module. In that embodiment, the historical data recorder functional module is controlled by an operator through requests presented to a presentation module 10. Initially, a such request, which identifies an entity and one or more attributes, along with a polling rate, establishes a record in the historical data file for the identified entity and attributes and enables the historical data recorder functional module to issue, at the polling rate specified in the request, subordinate requests to the entity enabling it to respond with value(s) representing the condition(s) of the entities of the complex system specified by the entity and attribute(s) specified in the request. In addition, other types of requests permit an operator to initiate other operations in connection with the historical data recorder functional module, including changing the polling rate, temporarily enabling and disabling the polling, and showing the last value in a response.

2. Dispatch Table

The contents of the dispatch table 28 and of the user interface information file 29, comprise enrollment information, and are provided by the various functional modules 11 and access modules 12 during an enrollment procedure. During an enrollment procedure in which a module enrolls in the control arrangement, it loads the display information, including name and code information from its name fields into the data dictionary. In addition, the module loads the code information and other information as defined by the management specification from the data dictionary (FIG. 4), and the dispatch information from its dispatch specification (FIG. 3E) into the dispatch table 24.

3. User Interface Information

The presentation modules 10 use the display information in the user interface information file 29 to determine, first, whether to display an entity, attribute, directive, and so forth, and, second, what to display. The user interface information file 29 forms a parse table that, in response to a command by an operator at a terminal, enables the presentation module 10 receiving the command to parse the command using the parse table to derive codes, corresponding to the codes for the request, entity and attributes defined in a management specification, which it transmits as a request to the kernel 13.

Note that functional and access modules do not need to have any user interface code. All user interface support is provided to these modules, and the module designer need not concern himself with the user interface. This simplifies module design tremendously, and guarantees that the system will have a uniform look and feel to the user, regardless of the actual modules in use.

Upon receiving a request from a presentation module, the dispatcher 16 calls the functional module 11 using the dispatch information in the dispatch table 28. The dispatch table 28 also forms a parse table, which the dispatcher 16 uses to dispatch to the proper procedure to process the request, as described below in connection with FIG. 9.

It will be appreciated that the use of codes in the parse table and in the dispatch table 28, while presentation specific information is being used in the user interface information file 29, essentially separates the identifications of the entities, attributes, and so forth, as used by the dispatcher 16, from the identifications displayed to the operators by the presentation modules 10. The display generated by the presentation modules 10 may, therefore, be in diverse languages, while the requests generated by the presentation modules 10 contain the same identifications of the entities, attributes, and so forth.

In addition, the user interface information file 29 may store information which is already available from the configuration database and data dictionary in a more convenient format.

For example, the class data in the data dictionary (FIG. 4) indicates all of the directives 223 supported by entities in the complex system. However, the directives 223 are stored in a hierarchical format, and are subordinate to the entity classes 220. Although this format is logical for representing entity class information, it is-less useful for a parse table. A user request typically lists the directive first (e.g. "SHOW" in "SHOW NODE FOO"), thus a parse table should have directives as the first level of a hierarchical structure. As can also be seen by the above example, a parse table may need to parse a command where class names (e.g. "NODE") are mixed with instance names (e.g. the identifier FOO in "NODE FOO"). Therefore, after a listing of the available directives, the parse table should list the class names which support those directives, and then the data types of instances of those classes. Although the class and data type information is available from a reorganization of the Data Dictionary, for expansion of wildcards, instance data can be obtained from the Configuration Database. Thus the parse tables in the user interface information file can consolidate directive and entity class, making the parsing of user input computationally more efficient.

The above example also applies to a graphical or menu-driven interface. However, in this type of interface, the user may wish to set a context for his commands, by graphically selecting a particular entity or domain of entities for the subsequent operations, and the OSI category (as listed in the category field 87 of the directive definitions) of the directives to be made. Next, a menu could be generated which listed all of the supported directives. The user could request a directive for one or more instances (e.g., by clicking on the directive and instance) or an entire domain or entity class (e.g., by clicking on the directive alone) using the pre-formed menus. On a EXAMINE or CATEGORY type directive, further menus may prompt the user to select attribute partitions or aggregations.

To implement this type of interface a listing of all of the domain and entity instances and a listing of all of the instances in a domain must be fetched from the configuration database. In addition, a forms database may store the directives supported by the class or domain.

The user interface information file may also store default value information. Default values for instances or classes may be provided by the user or by the Management Specification for the relevant entity class. This allows the user to save typing time by specifying a default value in a command. For example, the user may be most concerned with NODE FOO, and may specify "NODE FOO" as the default node. Later, the user can type a command such as "SHOW ROUTING", which would be interpreted as "SHOW NODE FOO ROUTING". Similar uses of default values can be used in a graphical environment.

Another example of user interface information is an on-line help file which is available to the user through presentation modules. The help file contains help information for using the existing set of management modules. In preferred embodiments, the help file is constructed from help information supplied by the modules when they are enrolled. The supplied help information may include a text description of the entity and subentity classes supported by the module, and the directives to those classes supported by the module. In addition, tutorial information can be supplied to educate a first-time user on the use of the module and its directives. The above information may also be determined from the management specification for the module, however, the help information file translates the management specification information into english sentences reducing the need for a user to learn the syntax of the management specification.

4. Historical Data Recorder

The historical data recorder functional module 11 may use the entities polling information from its portion of the data dictionary, including the portions relating to the maximum polling rate field and the default polling rate field, to initiate and control polling in connection with the entity's various attributes as defined in the attribute definitions 54, the responses to which the historical data recorder functional module 11 stores in its historical data file 26.

5. Module Enrollment

With reference to FIG. 5, An access module 12, for example, while it is engaged in an enrollment procedure, loads display information, including the name and code information defined in the name and code information from its name fields and information from the portion of its data dictionary related to the display fields in its management specification into the user interface information file 29. Similarly, a functional module 11 loads the code information and other information as defined by the management specification from the data dictionary (FIG. 4), and the dispatch information from the dispatch specification (FIG. 3E) into the dispatch table 28.

D. INTERMODULE AND INTER-NODAL COMMUNICATIONS

1. Control Functional Module

In one specific embodiment the operator may control an access module 12 directly, through a control functional module 11 that essentially generates subsidiary requests which are copies of requests which it receives from the dispatcher 16. In that embodiment, the presentation module 10 that receives the command, parses the command using the parse table in the user interface information file 29 to derive codes corresponding to the codes for-the request, entity and attributes of the access module 12 defined in a management specification, which it transmits as a request to the presentation-functional kernel 13. The control functional module 11 passes the request as a subsidiary request to the functional-access kernel 14, where it is treated in the same manner as any other subsidiary request.

Upon receipt of a subsidiary request from a functional module 11, the dispatcher 21 calls the access module 12 using the dispatch information in the dispatch table 28. The dispatch table 28 also forms a parse table, which the dispatcher 21 uses to dispatch to the proper procedure to process the request, as described below in connection with FIGS. 9A and 9B.

2. Inter-Nodal Communications

If the control arrangement controls a complex system comprising a distributed digital data processing system, FIG. 5 generally depicts elements, including a presentation module 10, a functional module 11 and an access module 12, including kernel 13, 14 comprising information manager 15, 20 and dispatcher 16, 21 and associated data files 23, 24, 25, 26, 27, dispatch table 28, user interface information file 29, all included in a single process in a single node of a distributed digital data processing system. If the distributed digital data processing system includes a presentation module 10, a functional module 11 and an access module 12 in different processes or nodes, the control arrangement includes a dispatcher 16, 21 in all processes and nodes. With reference to FIG. 6, when a dispatcher 16(1) in one process in a node receives a request from a presentation module 10(1) which must be processed by a functional module 11(2) in a second process or node, it transmits the request, by an interprocess communication mechanism, if the functional module 11(2) is in another process on the same node, or an internode communication mechanism to a process on the other node, to a dispatcher 16(2) in the other process or node. The dispatcher 16(2) then selects a functional module 11(2) to process the request. The dispatcher 16(2) receives the response generated by the functional module 11(2) and transmits it, by means of the interprocess communication mechanism or internode communication mechanism, to the dispatcher 16(1), which, in turn, enables a presentation module 10(1) to display the response to the operator.

Similarly, when a dispatcher 21(2) receives a subsidiary request from a functional module 11(2) to be processed by an access module 12(3) in another process or node, it transmits the subsidiary request to a dispatcher 21(3) in the other process or node by means of the interprocess communications mechanism or internode communication mechanism, respectively. The dispatcher 21(3) then transmits the subsidiary request to the access module 12(3) for processing. The dispatcher 21(3) receives the response from the access module 12(3) and transmits it, by means of the interprocess communication mechanism or internode communication mechanism, to the dispatcher 21(2), which, in turn, couples it to the functional module 11(2).

3. Request and Subsidiary Request Structure

Figure 7A:
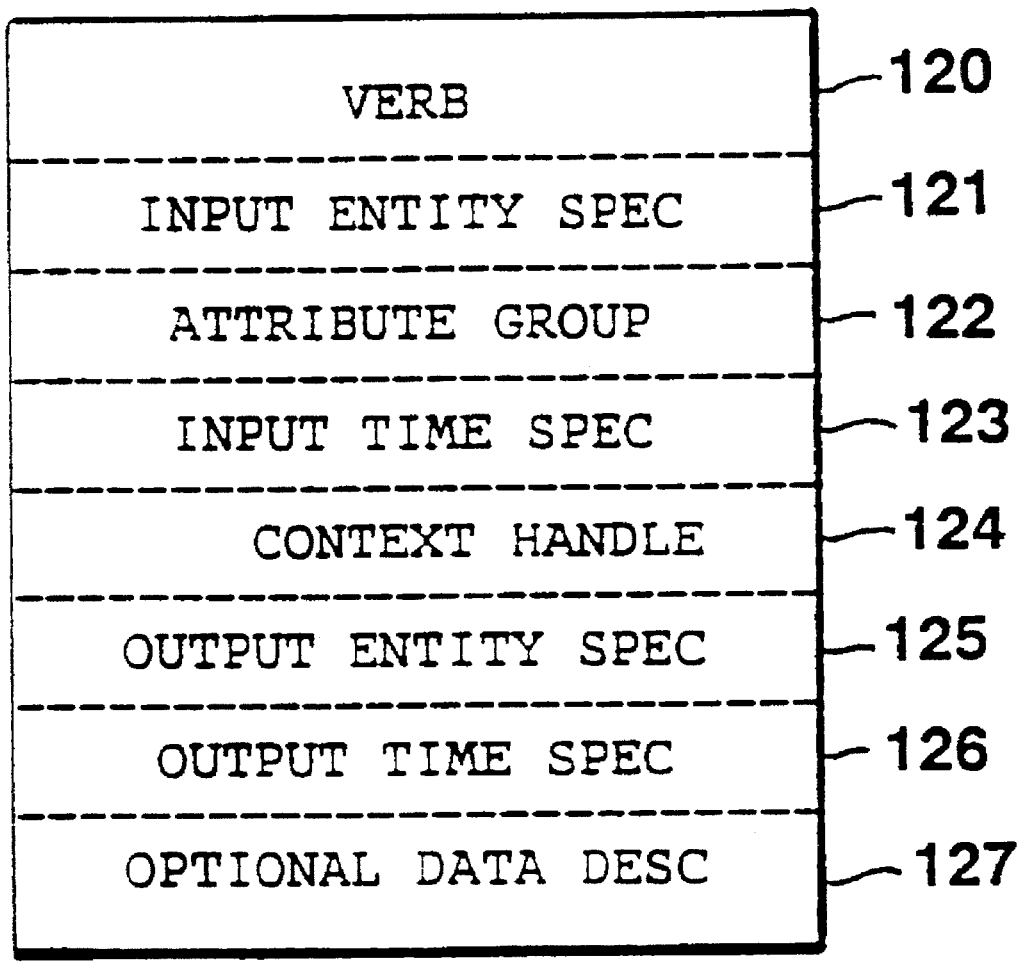
FIG. 7A depicts the parameters used in requests generated by the presentation modules and functional modules in the control arrangement depicted in FIG. 1A.

The structure of a request, and specifically the parameters that are included with the request, is depicted in FIG. 7A. The structure and contents of dispatch table 24 (which are similar to the structure and contents of dispatch table 26) will be described in connection with FIGS. 8A and 8B. Thereafter, the process performed by the information manager 15, 20 and dispatcher 16, 21 in connection with parsing of a request will be described in connection with FIG. 9.

With reference to FIG. 7A, a request, which may be generated by a presentation module 10 in response to operations by an operator in connection with the contents of user interface information file 27, or which may be generated by information manager 15 during polling in connection with the various entities of the complex system being controlled, includes a plurality of parameters. All requests have the same structure, including an initial call identification, which is not shown, followed by parameters, which are depicted in FIG. 7A. As discussed above, the kernel 13, 14 has a single dispatcher 16, 21 having a presentation-functional aspect 16 and a functional-access aspect 21. Which of these aspects are respectively enabled by a request is determined by the initial call identifier. The initial call identifier may indicate a call to a functional module or an access module, and is respectively routed to the corresponding aspect of the dispatcher. A presentation or functional module may call a functional module, and a functional module or access module may call an access module, but a presentation module may only call an access module through a "control" functional module, as discussed above.

The parameters include a verb field 120 whose contents identify the type of request, that is, an operation to be performed in processing the request. As noted above, a request may cause a functional module 11 or access module 12 to initiate a change in the status or condition of an entity in the complex system being controlled, it may initiate a return of information as to the status or condition of such an entity, or both. The contents of verb field 120 indicates the operation to be performed by the functional module 11 or access module 12.

In addition, a request includes an input entity specification field 121, which identifies the entity in the complex system being controlled. If the verb is a non-action verb, for example, if it requests a response indicating the values of one or more attributes, the request includes an attribute pointer field 122 which contains a pointer to one or more attributes in connection with which the operation, defined by the verb and entity class, is to be performed. If the verb is an action verb, that is, if it causes a change in the specified entity, the request does not have an attribute pointer field 122.

In addition, a request includes an input time specifier field 123 that contains a pointer which points to a time data structure that contains certain timing information, including the absolute system time, time interval definition, and the time accuracy specification, and an indication as to the time range of interest in the request, for scheduling purposes. An input/output context handle field 124 contains a value which identifies the request in the context of a multiple-part operation, each part of which requires a separate request. An output entity specifier field 126 contains a pointer to a data buffer which can be used by the dispatcher 15 (or dispatcher 21, if the parameters form part of a subsidiary request) in connection with identification of the entity.

A request also includes an output time specification field 126 that contains a pointer to a time stamp specification which is to be used by the functional module 11 (or access module 12 in the case of a subsidiary request) in connection with formation of the response. Finally, an optional data descriptor field 127 contains descriptors to buffers containing data which is to be used in processing the request and in which the entity is to store data comprising a response, respectively. Each descriptor includes a pointer to the starting location of the respective buffer and a length specifier indicating the length of the buffer.

In alternative embodiments of the invention, the request may also include qualifier fields, as a separate parameter or as an additional element of the parameter fields discussed above.

A WITH qualifier can be associated with the Entity field to, for example, filter the entity list produced by a wildcard For example, "BRIDGE * WITH STATUS= 'ON' AND FILTERING= 'OFF'" refers to every bridge class entity with its status flag set to ON and filtering flag set to OFF. (This example also illustrates the use of boolean functions such as AND, OR, NOT and XOR with qualifiers.) In preferred embodiments, to implement the WITH qualifier, all modules and the information manager are configured to check for the presence of a WITH clause at each level (i.e. global entity, sub-entity, sub-sub-entity) of the entity parameter.

Other qualifiers may be used as a distinct parameter of the request. For example, communications qualifiers include: a "TO <filename>" qualifier which sends the response of a request to a file named <filename>; a "FROM <filename>" qualifier which retrieves other request parameters from a file named <filename>; a "VIA PATH" qualifier which specifies a series of "hops" along a path, through a hierarchy of management modules (useful in specifying, e.g., the precise management module among several arrangements that will perform the operation); and a "VIA PORT" qualifier which specifies a particular network path a management module uses when performing the operation (useful, e.g., to specify that an access module will perform a diagnostic test using a specific EtherNet port.)

Similarly, distinct parameter qualifiers may specify a group of entities of interest. The "IN DOMAIN <domain name>" qualifier filters the directive to apply only to members of the domain named <domain name>.

Also, distinct parameter qualifiers may authenticate or authorize the requestor of management services which have limited access privileges The "BY ACCOUNT", "BY PASSWORD", and "BY USER" qualifiers are examples which specify the account name, password, or user ID of the requestor for these purposes.

In addition to the above, qualifiers specify the time that a directive should be executed. Generally, this is accomplished with an AT clause. For a show command, the syntax of an AT clause is:

$$\text{<AT-clause>} ::= \text{"AT"} \text{<time-arg>} \{", " \text{<time-arg>}\}$$

where the time argument <time-arg> may, e.g., indicate the start time ("START= <time>"), the end time ("END = <time>") or duration ("DURATION= <time-length>"), the period of repetition ("REPEAT EVERY [=] <time-length>"), the time accuracy ("CONFIDENCE [=] <time-length>), or the sampling rate ("SAMPLE RATE [=] <time-length>). These arguments may interact with one another to create a general schedule and scope of interest for a request. In particular, in one particular embodiment, the three time arguments, START, END and DURATION are related such that any two of them define a period. Thus when a time-normalized entity statistic is displayed, at least two of these qualifier arguments must be specified.

other time qualifiers may also be used. For example, a time qualifier of AT OR BEFORE <time> can be interpreted as a request for any information with a time stamp at or before the time given by <time>. Upon receiving a request with such a qualifier, an management module will continuously check for actions which produce the requested information. If the information is produced, for example by the actions of another party, it will be returned to the requestor. Otherwise, the management module will continue to check for the information until time <time> arrives. If the information is produced, then it will be returned to the requestor. Otherwise, at time <time>, the management module will force a poll of the information from access modules or the entities, and return the information to the requestor.

To complement the AT OR BEFORE time qualifier, a NOW time qualifier can also be implemented. This qualifier would immediately force a poll of the requested information.

E. TIME

As discussed above, the request structure includes a time specifier field 123. In addition, a field 124 contains a handle pointer to a context data structure, which is a dedicated segment of memory for storing processing context information. The handle is used as a "notepad" for communication of, for example, context information between modules and the information manager.

1. Timestamps

Each item of data contains a timestamp value. In the case of data returned to the user or a management module, the timestamp indicates: the instant of time at which an event described by a data item happened, the instant of time that applies to the data value(s) returned for a directive, or the instant of time when a requested action was actually performed. In the case of historical data stored in the historical data file, the timestamp indicates the instant of time at which a given data item had a particular value. For the purposes of the historical data file, a timestamp can be considered as a key or index. A scope of interest time specification 123 may be used to request the retrieval of a particular piece of stored information with a given key or index.

2. Scope of Interest

Scope of interest time specifications are supplied by requests using the time specifier field 123. Using a time specifier, other values of data than "the value it has right now" can be displayed and processed, and statistics can be computed over some time period. In one particular embodiment, a time "scope of interest" is expressed by prepositional phrases in the time specifier of a request. Generally, a time specifier is used with a SHOW command, but time contexts may also apply to MODIFY type requests and actions.

Time scopes of interest can be indicated by either an absolute instant, a sequence of absolute instants, an interval (start time "START" and duration "DUR"), a repetition of instants, or a repetition of an interval.

Any of these may have associated with them a relative time period ("EVERY") that specifies the periodicity with which the instant, instants, or interval is repeated. When a period is specified, the original instant, or sequence of instants or interval is treated as a base, to which the period is added, repetitively. For example, the time specification "5:00 EVERY 0:15" is equivalent to 5:00, 5:15, 5:30, 5:45, ... An absolute time instant ("UNTIL") can be specified to indicate when the repetition is to terminate. For example, the time specification "5:00 EVERY 0:15 UNTIL 6:00" is equivalent to 5:00, 5:15, 5:30, 5:45, 6:00. Repeating intervals may be specified in the same way. "START 5:00 DUR :05 EVERY 1:00" is equivalent to the intervals 5:00–5:05, 6:00–6:05, 7:00–7:05, . . .

3. Scheduling

Scheduling information is also provided by time specifier field 123. Specific scheduling times can be indicated by either an absolute instant, or a sequence of absolute instants. Unlike scopes of interest, scheduling times may not include an interval. Intervals whose begin and end points are equal resolve into instants (e.g. (TODAY,TODAY)).

A few rules apply to intervals. Intervals in the past may have begin points denoted by the keyword YESTERDAY, or an absolute time in the past. Similarly, intervals in the future may have a begin point denoted by the keyword TOMORROW, or an absolute time in the future. Also, the start time of an interval must be earlier than its end time.

4. Time Context Handle Structure

As discussed above, the scheduling and scope of interest information may be supplemented in a request with an associated context handle. The handle is created by the module which executes the request, and is subsequently used in communication with the service provider. When a call is received by the service provider, e.g. the Information Manager, a context block is created as a local reference to the request's time context.

Generally, context blocks and handles are used as references to the status of a request. As the initial request can generate many subsidiary requests, it is possible that many handles and context blocks can be created by a single request. The context blocks are the reference used by a service provider, whereas the handles are the reference used by the service requestor. Each process (i.e. module or information manager) in a request/subsidiary request chain knows only about the context block and handles relating to its local part of the chain.

Figure 7B:
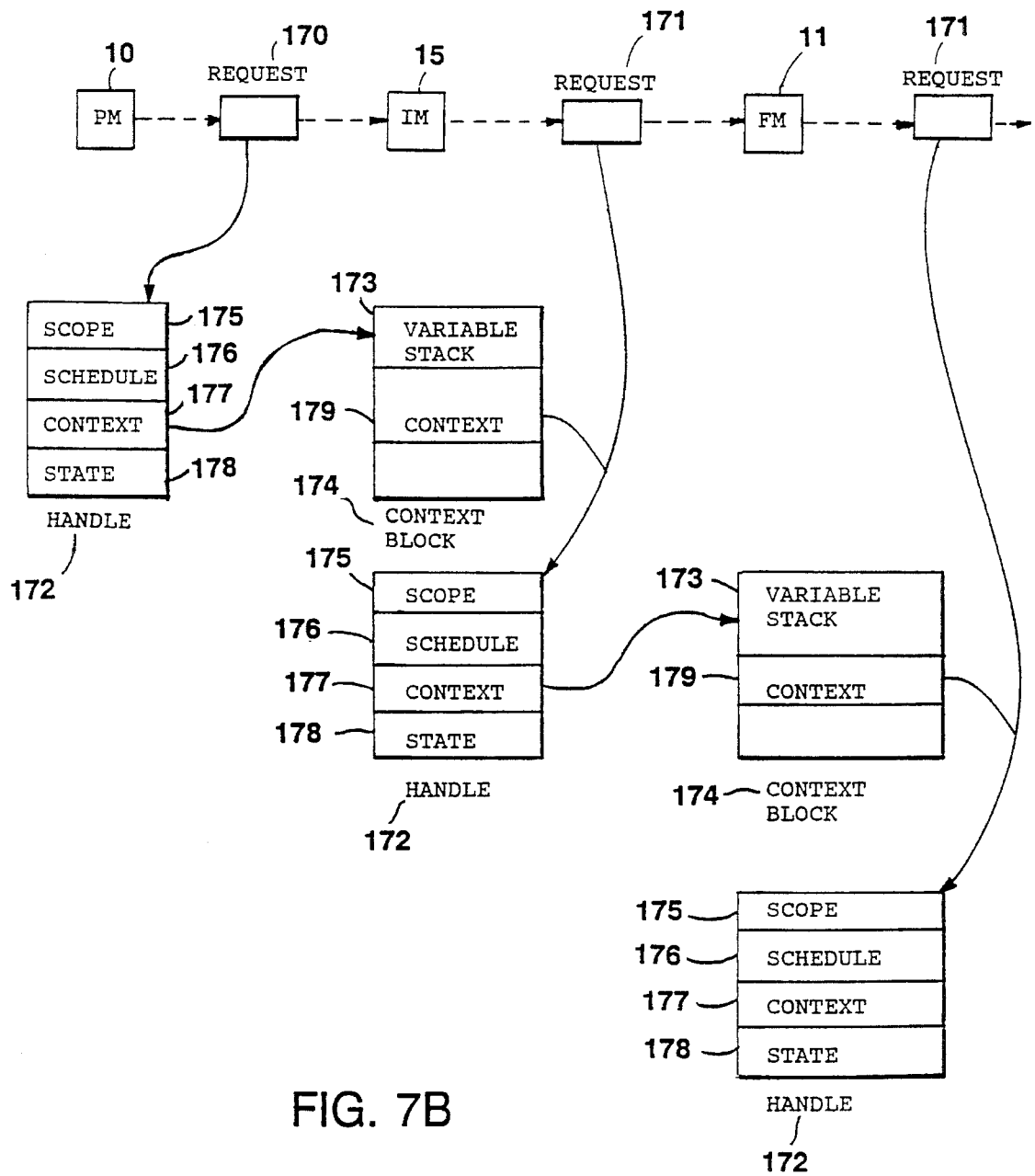
FIG. 7B depicts the structure of time context handles and context blocks used by the request of FIG. 7A.

Referring to FIG. 7B, in one particular embodiment, a time context handle 172 created by a requestor, e.g., a presentation module 10, includes a scope field 175 and schedule field 176 which relate to the time specification 123 of the initial request. These fields supplement the data in the time specifier of the request, and are used to determine the current status where multiple requests and responses exist for a single operation. The handle 172 also includes a context pointer 177 and a state variable 178. These data items provide the status and reference functions of the handle, and are created and stored with the scope and schedule fields 175, 176 when the request is made.

Where multiple requests and responses exist for a single operation, the context field 177 will eventually contain a pointer to an additional data structure 174, known as a context block, which is created and maintained by the service provider, e.g., the presentation-functional aspect 15 of the Information Manager (functional or access modules may also create and maintain context blocks in response to requests), in response to an initial request requiring multiple responses.

The state field 178 of the handle contains one of three values: "FIRST", "MORE", or "CANCEL" which are used as flags to indicate further actions that should be undertaken. When first created, the handle state is set to "FIRST".

As discussed above, if a request can be satisfied by a single response, the response is generated and returned to the requestor. In the more general case, the service provider, e.g., a functional module, information manager, or an access-module, cannot satisfy the request in one reply. For example, the requestor may have used wildcarding in the input entity parameter 121, to specify a group of entities. As each reply can only incorporate information from a single entity, several replies are required, one for each entity. In another case, a request to a single entity may have a time specifier with several different time values. As each reply can only incorporate information for a single time value, several replies are required, one for each time. A request that requires multiple replies can be for any type of operation, including obtaining attribute data about an entity or entities, modifying attributes of several entities and modifying the state of several entities.

When the service provider processes the request and determines that it has additional replies, it is responsible for indicating this to the requestor. Thenceforth, the requestor is responsible for querying the service provider for the additional replies. To implement this, intermediary processes, e.g., the Information Manager, must save the information relevant to the request that it has generated.

The latter function is accomplished by creating a context block 174, which may contain relevant private variables 173 that have been generated in responding to the request, such as a pointer to the dispatch entry of the service provider (see discussion under Dispatch Table, below), as well as a context pointer(s) 179 to any handles that relate to subsidiary requests to, e.g. a functional module.

The handles and context blocks are used as follows. The service provider notifies the requestor that it has additional replies by using the appropriate handle modification routines to: (1) save a pointer 177 to its context block 174 in the requestor's handle 172, and (2) set the state field 178 in the requestor's handle 172 to a value of "MORE". When the reply is returned to the requestor, the requestor sees the "MORE" state in its handle state field and thus knows that the service provider has additional replies for this request. If the requestor does not want these additional replies, it must cancel the request (see below). If the requestor wants the additional replies, the request must be repeated, without changing any parameters.

When the service provider receives these repeated requests (which will have a handle state field 178 equal to "MORE"), it searches for and detects the "MORE" state using the appropriate handle access routine. Then the service provider knows that the calls are part of a previously established request. (Note that a handle with a state of "FIRST" indicates to the service provider that the associated call is the first call of the request.) For each call with a "MORE" handle state, the service provider retrieves the context block 174 pointed to by the handle context field 177, and uses the context block to continue its execution to provide the additional replies. There is only a single reply for each call made to the service provider. As long as the service provider maintains the handle parameter in the "MORE" state, it has more replies for the request.

When the service provider is returning to the requestor with its last reply (determined by, e.g., the scope and schedule fields 175, 176 in the requestor's handle), the requestor's handle state field 178 is set back to a value of "FIRST" (the initialized state). When the return is made to the requestor with this last reply, the requestor sees its handle parameter state set to "FIRST" and knows that its request has been fully satisfied. Note that if the request is satisfied with a single reply, the service provider retains no context and never causes the state of the handle parameter to become the "MORE" state. The requestor's handle stays at its initialized "FIRST" state, indicating to the requestor that the request is completed.

When a service provider returns the handle parameter in a "MORE" state, the request must be repeated or cancelled. If the request is otherwise abandoned, system resources will be lost, owing to the memory allocated to the handle and context block.

Note that for the above discussion, if the service provider did not issue subsidiary requests, a single handle would suffice for communications between the service requestor and provider. However, if the service provider did issue subsidiary requests there would be more than one separate handle—the initial requestor's handle, which is provided by the requestor for the call, and different handles created by, e.g., the Information Manager and forwarded to, e.g., an access module.

Where multiple requests and responses exist for a single operation, scheduling subsidiary requests to the service provider is performed by the Information Manager, and is controlled by the schedule time component of the time specification parameter 123. For each schedule time specified in the time specification, the Information Manager will create a request which causes the service provider to perform the requested operation and issue responses.

When the service provider has completed the requested operation, it issues a response. When the Information Manager sees that the service provider has completed the requested operation, it then examines the schedule time context that it keeps for the initial request. If there are further times for which the requested operation is scheduled, the Information Manager does not set the requestor's handle state to "FIRST", but leaves it in the "MORE" state. The requestor sees its handle parameter still in the "MORE" state, and knows that the full request has not been completed, and asks for the remainder. The Information Manager then causes a wait until the specified schedule time, then allows the Dispatcher to perform another call to the service provider. Note that the service provider cannot distinguish this next call from that of a completely new request, as it has retained no context after returning with its handle state set to "FIRST". Also, the requestor does not distinguish between a handle state of "MORE" caused by the service provider having more replies to a request and the Information Manager preparing for a new schedule time instant.

In other embodiments, the handle access routines would be enhanced to permit the client to determine the cause of the "MORE" state of the handle parameter.

If, during a request with multiple replies or multiple schedule times, the requestor decides that it does not want any further replies from the service provider for this request, it must cancel the request. Possible reasons for wishing to cancel the request include receiving an exception reply that indicates that further data will not be useful, or receiving an error condition that indicates that the desired operation is not performing properly. The reasons for canceling are the responsibility of the requestor. A cancel terminates all activities of the request, including any scheduling and scope of interest operations.

A cancel can be done when the service provider returns to the requestor with a handle parameter state of "MORE". The requestor performs the cancel by using the appropriate handle modification routine to change the handle parameter state to a value of "CANCEL" and re-issuing the call. The requestor must not change any other parameters for this call. When the service provider receives this call, it sees the handle parameter in a state of "CANCEL" instead of the expected "MORE" state. It retrieves its context from the handle parameter and uses that context to perform any cleanup required. This cleanup includes canceling lower level requests that it is making, terminating any processing, and returning any system resources. When the service provider has completed its cleanup, it uses the appropriate handle modification routine to re-initialize the handle parameter back to the "FIRST" state. It then returns with the special condition value return code of CANCELED to indicate a successful cancel of the request.

The requestor cannot cancel a request after the service provider has returned with a handle parameter state of "FIRST". The request is already completed, and no service provider context exists to cancel.. Therefore, the cancel routine described above will return an error if the handle state is not "MORE".

F. DISPATCH

Figure 8A:
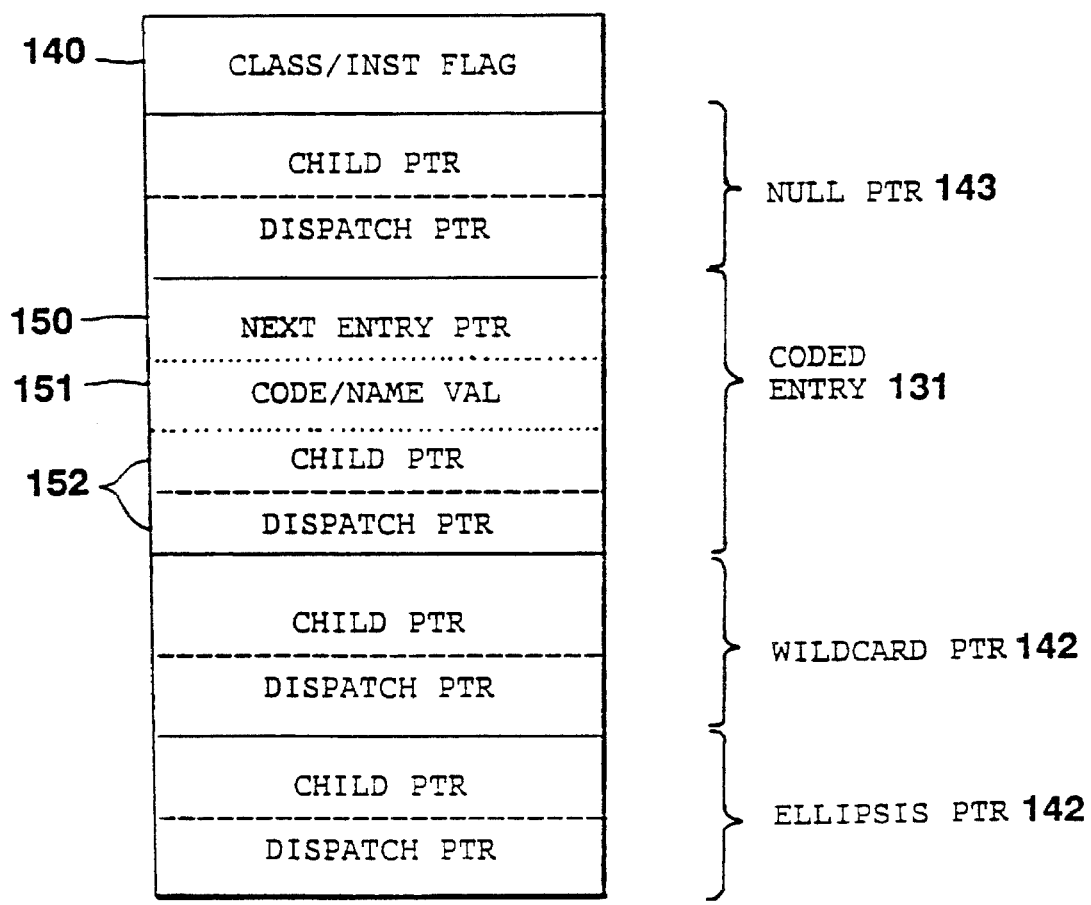
FIGS. 8A and 8B depict data structures in dispatch tables used by a dispatcher as depicted in FIGS. 5 and 6 in connection with processing of requests from the presentation modules and functional modules in the control arrangement depicted in FIG. 1A.
Figure 8B:
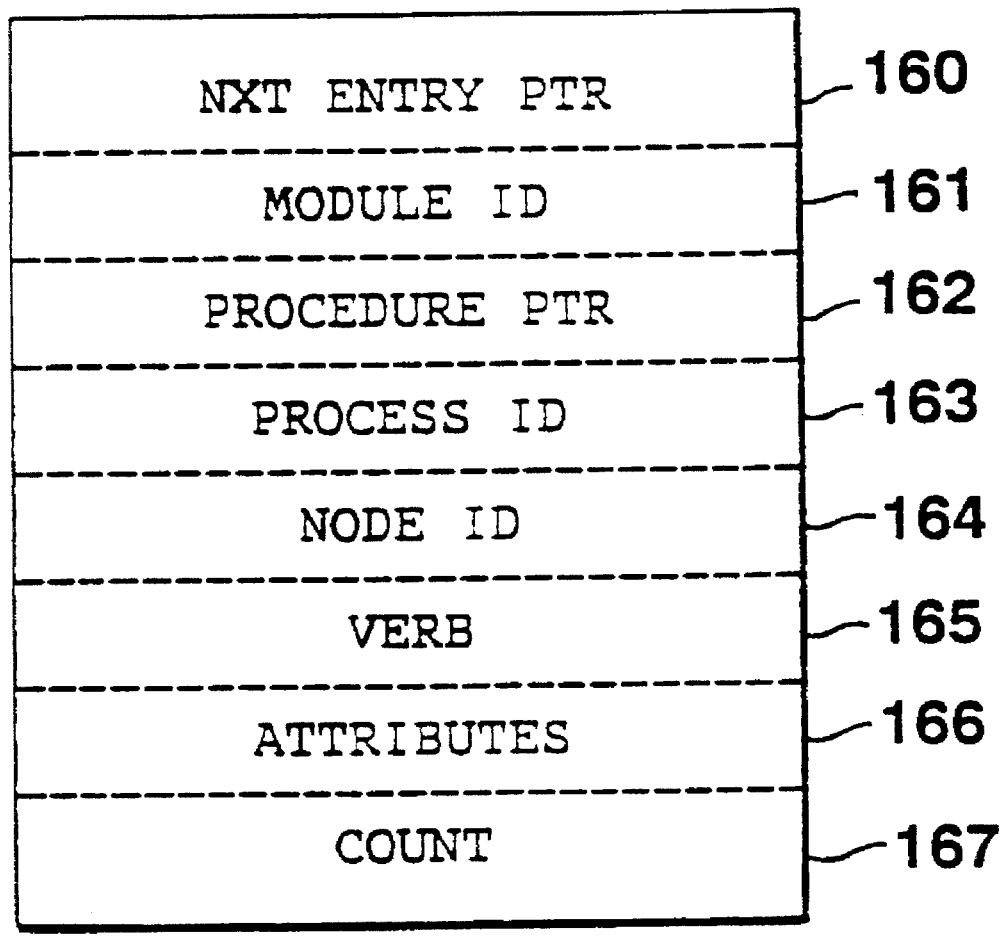

The dispatch tables 28 include a plurality of data structures, one of which is shown in FIG. 8A, and one or more dispatch lists including dispatch entries, one of which is depicted in FIG. 8B. The dispatch tree and dispatch lists essentially form parse tables which are used in parsing a request, as described below in connection with FIG. 9. With reference to FIG. 8A, a dispatch tree includes a plurality of entity nodes 130. The entity nodes 130 are organized in a tree structure to assist in parsing, but they may be organized into other data structures. The entity nodes identify the various entities in the complex system in connection with which a request may be issued. The entity nodes 130 include pointers which point to dispatch entries 134 (FIG. 8B) in the dispatch lists maintained in respective dispatch tables 28.

The term "entity node" is used to describe the data structure 130 because it satisfies the entity model set forth above. Generally, data structure 130 satisfies the entity model because it has a hierarchical structure and its child structures resemble it. The term "entity node" as it is used to describe data structure 130 should not be confused with the term "entity" used to describe elements of the complex system.

An entity node 130 includes several fields, including a class/instance flag field 140 which indicates whether the entity node 130 relates to an entity class or an instance within a class. Each entity may be an instance of a class, the class being defined by a class name identified in the entity's entity definition 46 (FIG. 3A), and the dispatch table 24 includes separate entity nodes 130 associated with the class and the instance, as described below in connection with FIG. 9.

While parsing a request, the class names and instance names of an entity and its subentities are parsed using data structures of the type shown in FIG. 8A, although the structure is used differently in parsing the class names or instance names. The class or instance case is indicated by the class/instance flag.

The entity node 130 also contains tree link pointers that identify various other elements in the dispatch table 28. A module which services requests relating to several entities of the same class may be identified by means of a wildcard or an ellipsis. If so, an entity node associated therewith has a wildcard pointer in a field 141 or an ellipsis pointer in a field 142. Each wildcard pointer and ellipsis pointer comprises a tree link entry, as described below. If the entity node relates to a class which has no instances, an example of which is described below in connection with FIG. 9, a field 143 contains a null pointer comprising a tree link entry to another entity node. Finally, a field 131 contains a coded entry, which contains the code identifying the class or the name of an instance of the entity associated with the entity node as well as a link pointer.

The coded entry field 131, depicted in the entity node 130 on FIG. 8A, is one entry in a coded list. (The remainder of the list is not shown.) The coded list is a linked list which contains names of classes of entities defined by the management specifications of the entities (see FIGS. 3A through 3D), when referring to classes or names of instances of entities. Each coded entry 131 includes a pointer 150 to the next coded entry in the list, a class code/instance name value field 151, and a field 152 which contains a links entry 133 which includes a pointer to an entity node 130 or to a dispatch entry 134.

The class code/instance value field 151 in the coded entry 131 contains either a class code or an instance name. The contents of field 151 comprise a class code if the class/instance flag field 140 of the entity node 130 is conditioned to identify the entity node as being related to a class. Alternatively, the contents of field 153 comprise an instance name if the class/instance flag field 140 of the entity node 130 is conditioned to identify the entity node as being related to an instance.

Referring to FIG. 8B, the dispatch entries 134 in a dispatch list are used to identify the particular procedure to process a request. A dispatch list is a-linked list of one or more dispatch entries 134, each entry 134 containing information useful in transferring a request or subsidiary request to an appropriate functional module 11 or access module 12. More specifically, a dispatch entry 134 includes a pointer 160 to a next dispatch entry 134 in the list. A field 161 includes an identification of the functional module 11 or access module 12 during whose enrollment the dispatch entry 134 was generated. A dispatch entry 134 also includes a series of fields 162 through 164 which point to a procedure, process and node in the complex system for processing a request. A field 165 identifies the verb with which the dispatch entry is associated and an attribute field 166 identifies a set of attributes, as identified by attributes defined by an attribute definition field 54 of the management specification (FIG. 3B). Finally, a count field 167 identifies the number of times the dispatcher has used the dispatch entry 134 in connection with processing a request or subsidiary request.

With this background, the process performed by dispatcher 16 in parsing and dispatching a request from a presentation module 10 will be described in connection with FIG. 9. It will be appreciated that the dispatcher 21 performs a similar process in connection with a subsidiary request from a functional module 11. With reference to FIG. 9, a request 180 as follows:

SHOW

NODE <node name>

ROUTING

CIRCUIT <routing circuit name>

CHARACTERISTICS which is used in connection with a distributed digital data processing system. The request 180 includes a number of sections, including a verb section 181, namely SHOW, an entity section comprising a plurality of entity class codes and instance names 182 through 186, and an attribute section 187 comprising a plurality of attributes. In this example, the verb SHOW initiates generation of a response from the entity named in the request, relating to the named characteristics.

In the request 180, the entity section, namely, elements 182 through 186, includes a number of class/instance pairs. In particular, element 182, NODE, is a class code, and element 183, namely, <node name>, identifies, by instance name <node name> an instance of the entity class NODE. In the distributed digital data processing system, <node name> identifies a node in the distributed digital data processing system.

In addition, the request 180 further includes, in the entity section, an entity class code 184, ROUTING, which has no instances. In addition, the request 180 has a further entity class code, CIRCUIT, which has an instance identified by <ROUTING CIRCUIT NAME>.

With reference to FIGS. 3A through 3D, which depict a management specification, various elements of a request in connection with an entity are specified by the management specification. Specifically, the contents of the verb section 181 of a request are taken from the directives defined by the directive definitions 56, the entity class and sub-entity class names 182, 184, 185 are taken from the entity class code field 47, and the attributes section 187 is taken from the attribute definitions 54 of the management specification for the entity.

The entity and sub-entity instance names are taken from instance data known to the user (for example, by reference to the configuration database or through automatically generated menus).

In response to the receipt of a request, the dispatcher 16 first begins parsing the request in the entity section, beginning with global entity class code element 182, using entity nodes 130 (FIG. 8A). In particular, with reference to FIG. 9A, the dispatcher 16 first (step 190) begins at a root entity node 130, which has a class/instance flag 140 which identifies the entity node as being associated with class codes, and searches for an entry of its coded list 131 which contains a coded entry 131 that, in turn, has a class code field 151 which contains a class code of NODE. If the dispatcher 16 is unable to find such an entry in the dispatch table 28, it searches for a wildcard or ellipsis pointer (see below). (If no wildcard or ellipsis pointers are found, it responds with an error to the module 10 from which it received the request.)

If the dispatcher 16 locates such an entity node 130 in dispatch table 28, it sequences to the next step (step 191) in the parsing operation, in which attempts to locate an entity node 130 which is associated with instance <node name>, as specified in the entity element 183. In that operation, the dispatcher 16 uses the contents of pointer field 152 in the coded entry 131 to locate an entity node with a class/instance flag 140 which identifies the entity node as being associated with instance names and whose coded list includes a coded entry 131 whose instance name entry 132 corresponds to the <node name> in entity element 183 of the request 180. Again, if the dispatcher 16 is unable to locate such a node 130 in the dispatch table 28, it searches for a wildcard or ellipsis pointer (see below).

On the other hand, if the dispatcher 16 locates an entity node associated with element 183 in dispatch table 28 in step 191, it sequences to the next step (step 192), in which it attempts to locate an entity node associated with class code 184, ROUTING. In that operation, the dispatcher 16 uses the pointer in field 152 of coded entry 131 and the entity element ROUTING from the request to locate an entity node 130 which includes a class/instance flag 140 which identifies the entity node as being associated with class codes, and whose coded entry list includes a coded entry 131 which has a class code field 151 that contains ROUTING. In that situation, since the entity class ROUTING is an entity class with no instances, the pointer field 152 in the coded entry 131 is null. In this case, the null pointer field 143 in the entity node 130 points to a second entity node 130 associated with the class entity CIRCUIT.

In step 192, the dispatcher 16 uses the null pointer in the entity node 130 associated with the ROUTING class entity located in step 192 to locate a second entity node 130 whose class/instance flag 140 indicates that it is associated with class codes, and a coded list which contains a coded entry 131 whose class code field 151 contains CIRCUIT (step 193). If the dispatcher is unable to locate such an entity node, it searches for a wildcard or ellipsis pointer (see below).

If, on the other hand, the dispatcher 16 locates an entity node 130 in step 193, it sequences to step 194, in which it attempts to locate an entity node 130 identifying the instance entity element <ROUTING CIRCUIT NAME>. In that operation, it uses the pointer in field 152 of the coded entry 131 to locate an entity node 130 whose class/instance flag 140 identifies it as being associated with instance names and whose coded list includes a coded entry 132 whose instance name field 151 contains <ROUTING CIRCUIT NAME>, as specified in instance entity 186 of the request 180. If the dispatcher 16 is unable to locate such an entry, it searches for a wildcard or ellipsis pointer (see below).

On the other hand, if the dispatcher, in step 194, locates an instance entity node 130 which identifies the instance entity element 186, it has successfully parsed the entity section 182 through 186 of the request 180. Thereafter, the dispatcher 16 uses the pointer in field 152 of the coded entry 131 located in step 194, the verb in verb element 181 and the attributes in characteristics element 187 of the request to identify a dispatch entry 134 (FIG. 8B) to be used in processing the request. In particular, following step 194, the dispatcher 16 uses the pointer in field 152 of coded entry 131 to identify a list of dispatch entries 134. Thereafter, the dispatcher 16 attempts to locate a dispatch entry 134 the contents of whose verb field 165 corresponds to the verb element 181 of the request 180, in this case SHOW, and the contents of whose attribute field 166 corresponds to the attributes in the CHARACTERISTICS element 187.

If the dispatcher 16 locates, in step 195, such a dispatch entry 134, it uses the contents of the procedure identification field 162, process identification field 163, and node identification field 164 to call the procedure to process the request. In this operation, the dispatcher 16 effectively transfers the request to the entity for processing. It will be appreciated that, as described above in connection with FIG. 6, if the process identification in field 163 and node identification in field 164 identify another process or node than contain the dispatcher, the dispatcher transfers the request to the dispatcher in the other process or node, as identified in the respective fields 163 and 164, for processing.

The above describes the use of the coded entries of the dispatch table. The wildcard and ellipsis pointers offer an additional functionality to the table. For example, one management module may handle all requests for modules of a particular global or subordinate entity class. Without wildcard and ellipsis pointers, all of the instances of the class and instances of any subclasses would have to be enumerated in the dispatch table. To avoid this, wildcard and ellipsis pointers are provided, and may be used in a dispatch specification 39A (FIG. 2B) to indicate in a general fashion which entity classes and instances a management module services.

One example of such a dispatch specification is:

NODE * ROUTING CIRCUIT . . .

which indicates that the module can handle, for any instance of a NODE class global entity, all instances of the subentity class CIRCUIT as well as all subentities of CIRCUIT class subentities. The asterisk (*) matches any instance name, and the ellipsis ( . . . ) matches any instances of the subentity or class/instance pairs of subentities which may follow. For example, the expression NODE foo ROUTING CIRCUIT bar LINK fred would match the dispatch specification because "*" would match "foo", and " . . . " would match "bar LINK fred".

Figure 9A:
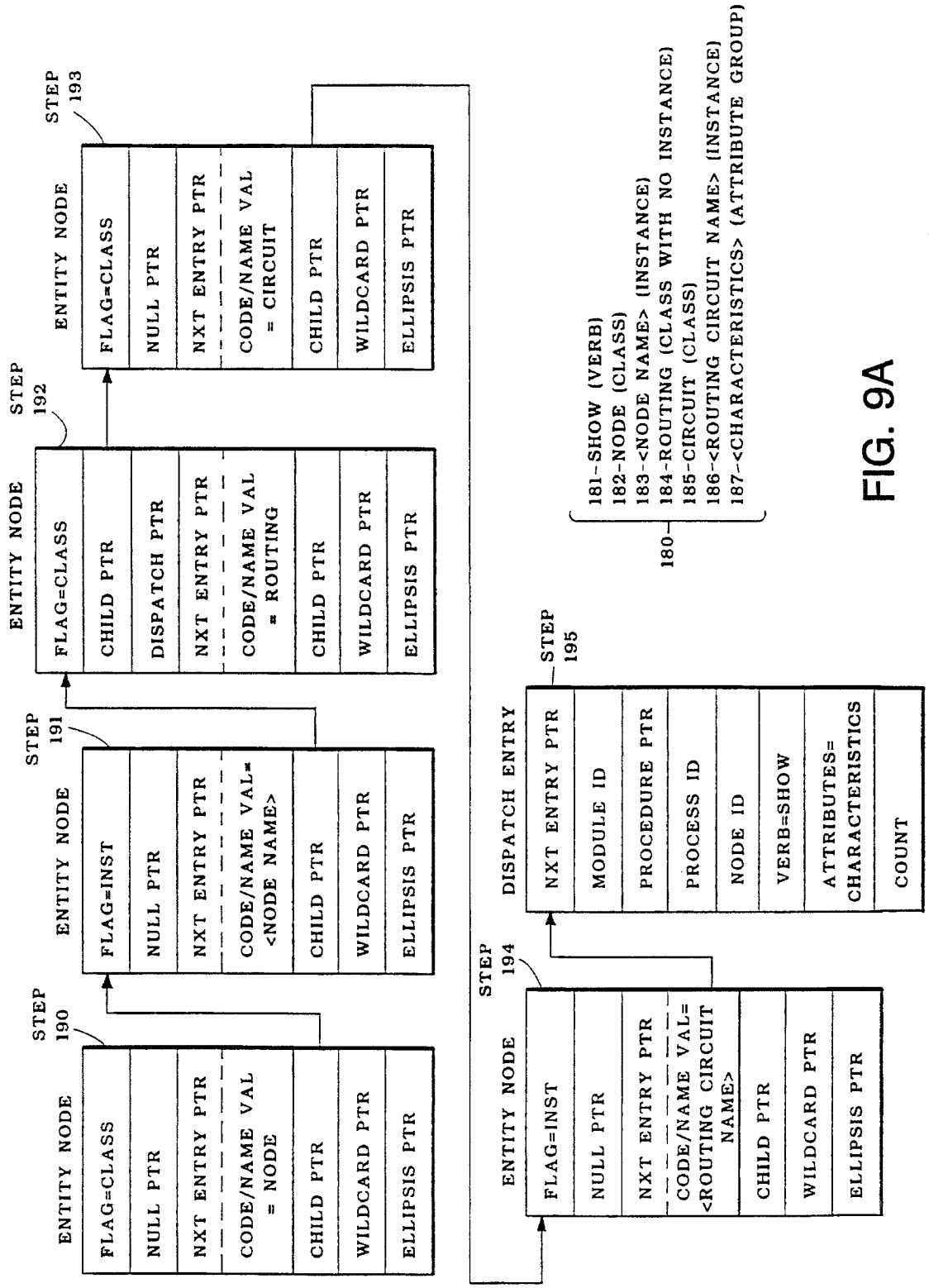
FIGS. 9A and 9B depict the operations of a dispatcher in connection with its associated dispatch table in processing a request from a presentation module or a functional module.
Figure 9B:
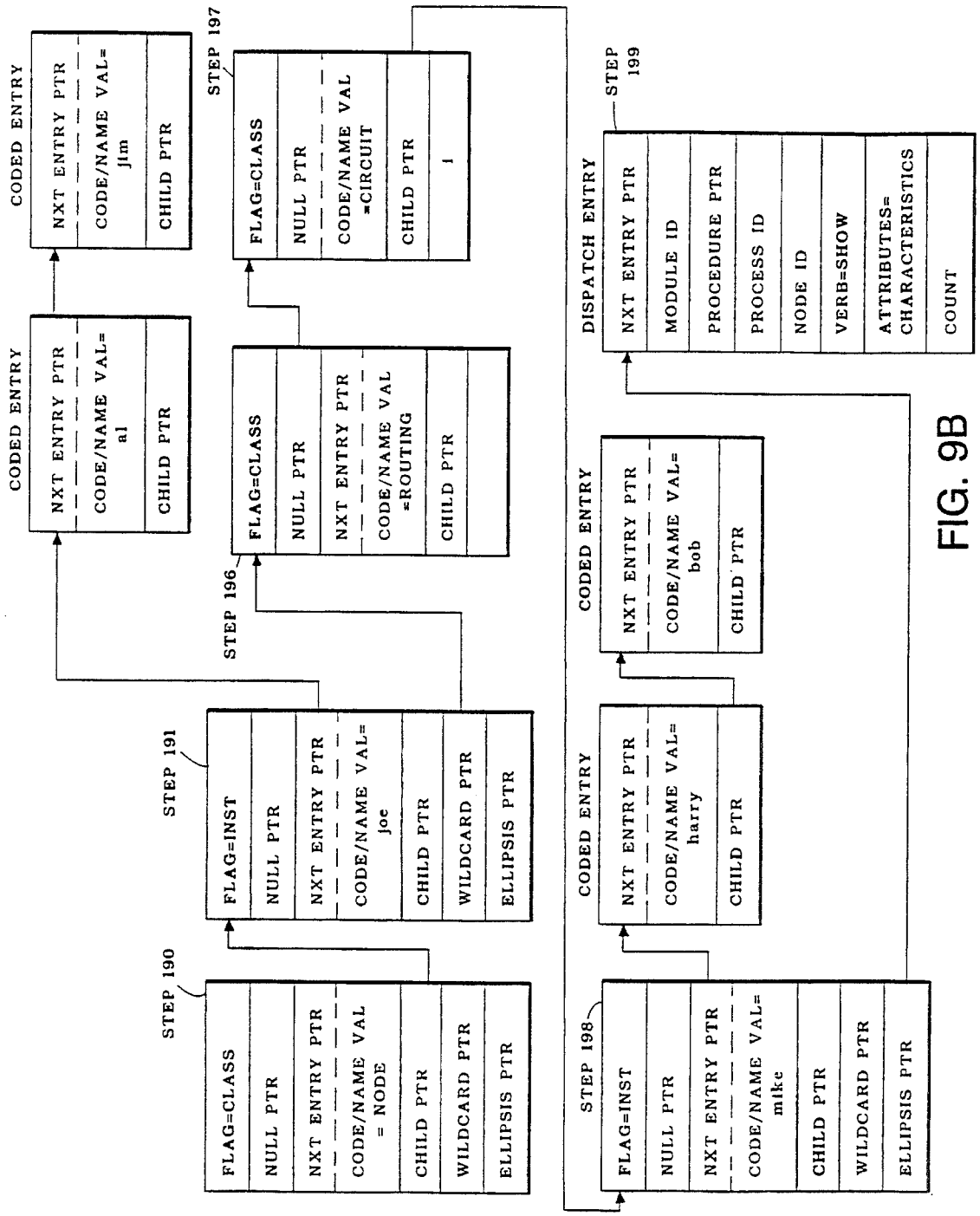

Referring to FIG. 9B, to enter a wildcarded dispatch specification in the dispatch table 28, the entity node 130 at step 191 (FIG. 9A), which corresponds to instance names of NODE class entities, would be modified. The wildcard pointer 141 would be changed to point to a new entity node 130 (step 196) which contained class codes, one of which was the class code ROUTING. The child pointer related to class code ROUTING would be null (as in step 192, FIG. 9A) and the null pointer would point to another new entity node 130 (step 197), which would have a child pointer corresponding to the class name CIRCUIT. This child pointer would point to another new entity node 130 (step 198), whose ellipsis pointer would point to the dispatch entry for the module (step 199).

Parsing of the modified table would be similar to that described by FIG. 9A, until step 191. At step 191, the dispatcher 16 would search for an instance of the NODE class with name, e.g., "foo". If this name was found in the coded entries (three being shown for illustrative purposes) then the dispatcher would proceed according to the child pointers in the coded entries. However, if the name "foo" was not found in the coded entries (indicated by a null NEXT ENTRY pointer in the last coded entry), then the dispatcher would search for a non-null wildcard pointer at step 191. After locating the wildcard pointer, the dispatcher would then proceed to step 196.

Steps 196 and 197 are similar to steps 192 and 193 of FIG. 9A. The dispatcher uses the null pointer in step 196 (corresponding to the class code "ROUTING") to move to step 197, and then uses the child pointer corresponding to the class code "CIRCUIT" to move to step 198.

At step 198, the dispatcher will search the linked list of coded entries (three being shown for illustrative purposes) to locate an instance name of "bar". If this name is not found in the coded entries, the dispatcher then searches for a non-null wildcard pointer. If this is not found, the dispatcher searches for a non-null ellipsis pointer. This will be located, and used to traverse to the dispatch entry (step 199). The contents of the dispatch entry would then be used to call the appropriate module.

Note that the wildcard and ellipsis pointers allow general matching of entity class codes and instance names, but only after the coded entries of the dispatch table are checked. In this way, the dispatcher searches for the "most specific match" of the entity name. Therefore, for example, a first module can have a dispatch specification:

NODE * ROUTING CIRCUIT . . .

which indicates that the module can handle, for all instances of a NODE class global entity, all instances of the CIRCUIT class subentity of a ROUTING class subentity. A second module can have a dispatch specification NODE joe ROUTING CIRCUIT . . .

which indicates that the module can handle, for instance "joe" of the NODE class global entity, all instances of the CIRCUIT class subentity of a ROUTING class subentity.

To be consistent with the "most specific match" rule, all directives to NODE joe ROUTING CIRCUIT subentities should be sent to the second module. This is accomplished with the dispatch table schema because the instance name "joe" will appear in the coded entries at step 191, and therefore if "joe" is the instance name in a request to a ROUTING CIRCUIT, the "joe" coded entry will be used (because it is checked first), and the wildcard pointer will not be used.

To properly parse the dispatch tree, a stack must also be used by the dispatcher. A simple example will explain why this is necessary. Consider a new module having the dispatch specification NODE jim DISKDRIVE . . .

which indicates the module can handle, for instance "jim" of the NODE class global entity, all instances of DISKDRIVE class subentities. This specification would be entered in the tree by adding a coded entry at step 191 with the instance name "jim", and adding subsequent new entity nodes, in similar fashion to FIG. 9B. Subsequently, when dispatching requests with global entity class and instance names:

NODE jim the dispatcher would travel to the new entity nodes.

However, a request with an entity name starting with

NODE jim ROUTING CIRCUIT could not be serviced by the new module, since the new module only supports DISKDRIVE class subentities for NODE instance "jim". Therefore, once the dispatcher determines that the class name ROUTING CIRCUIT is not supported by the new module, it must have a mechanism for returning to step 191, and potentially using other coded entries or the wildcard or ellipsis pointers to find a module which will service the "NODE jim ROUTING CIRCUIT" request. Therefore, as the dispatcher traverses the dispatch table, it maintains a stack of pointers to all of the entity nodes 130 which it has traversed from the root node. Pointers are pushed onto and popped off of this stack as the dispatcher moves up and down through the dispatch table tree structure attempting to find the appropriate dispatch entry.

If no matching dispatch entry is found, an error is returned to the requestor (i.e. presentation or functional module).

As discussed above, a control functional module may serve as a pass-through from the presentation modules directly to the access modules. To implement such a pass-through, the ellipsis pointer for the root node of the presentation-function aspect of the dispatch table (which will match any entity name in any request) should point to the dispatch entry for the control functional module. Whenever it receives a request, the control functional module will simply issue an identical request to the function-access aspect of the dispatcher. In this way, all requests which do not match dispatch specifications in the presentation-function dispatch table will also be routed for matching in the function-access dispatch table. This allows presentation module requests to access primitive functions available from the access modules.

In an alternative embodiment of the dispatch table, to allow more than one class code which doesn't have instances, the null pointer field 143 may contain the first element of a linked list similar in structure to the list of coded entries 131. The second, "null" list would contain code values of class codes which have no instances. The null list would be parsed after the coded list, but before checking for a wildcard pointer.

G. DOMAINS AND CONFIGURATION

As described above, a configuration functional module 11 maintains a configuration database defining the entities comprising the complex system. By means of appropriate commands from an operator, the configuration functional module 11 can add instances of entities, as defined in the data dictionary, to the configuration database, delete them from the configuration database, and change the definitions in the configuration database. As also described above, a domain functional module 11 establishes a domain entity in the configuration database which refers to a subset of the entities already defined in the configuration database. An operator, through a presentation module 10, can control and monitor the entities comprising a specific domain, without regard to the possibly myriad other entities comprising the complex system. In addition, an operator can initiate a control or monitoring operation in connection with entities only in the domain, without having to initiate generation of a request by a presentation module 10 for each entity, thereby simplifying control and monitoring of the complex system.

The domain functional module 11 establishes, within or in addition to the configuration database, a domain database for each domain entity, identifying the entities comprising the domain entity. Upon receipt of an appropriate request, the domain functional module 11 will add an entity to a domain database, thereby adding the entity to the domain, delete an entity from a domain database, thereby deleting the entity from the domain, generate a response identifying the entities comprising a domain as identified in the domain database, and delete a domain database, thereby effectively deleting the domain.

Figure 9C:
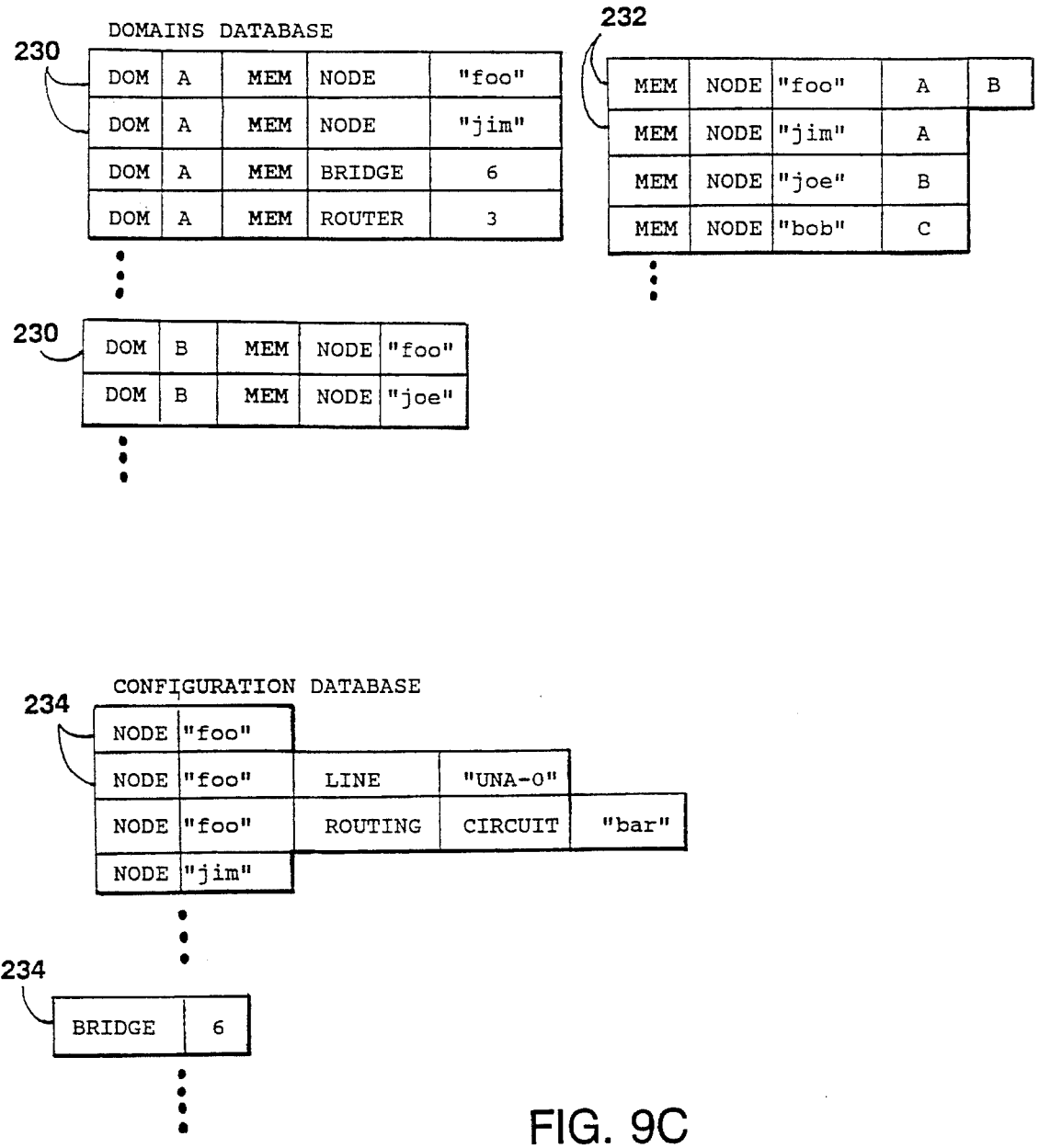
FIG. 9C depicts the format of a configuration and domains database.

Referring to FIG. 9C, the format of the configuration and domain databases (which may be incorporated in a single database) includes a field for each entity instance in the configuration, and similarly, each entity instance in the domain.

The domain database includes an entry 230 for each member of a domain, listing the domain name and the instance name of the entity or subentity member. In addition, the domain database includes an entry 232 for each entity which is a member of any domain, listing the instance name and the domains which it is a member. The domain functional module updates this information as the domains are modified, and can use the information to quickly determine the members of a domain, or, alternatively, to quickly determine the domain membership of an entity.

In alternative embodiments, a first domain may incorporate the members of a second domain by reference to the second domain, thus reducing the size of the domains database. In other embodiments, the domains database may establish a hierarchy of domains similar to the hierarchy of entities and subentities, and commands may be directed similarly to domains and subdomains.

The configuration database includes an entry 234 for each entity and subentity, organized hierarchically in the database. The full name for each entity and subentity instance is provided. This information can be used by the configuration functional module to quickly determine the configuration, for example, to display (via a presentation module) to the user a map of the configuration or menus of entity instance names.

H. ALARMS

AS described above in connection with FIG. 1B, one functional module 11 comprises an alarms functional module 11, which can establish alarm conditions, in response to requests from a presentation module 10, and, using the various conditions of the entities of the complex system, as, for example, recorded in the user interface information file 29, detect the occurrence of an alarm condition.

Figure 10A:
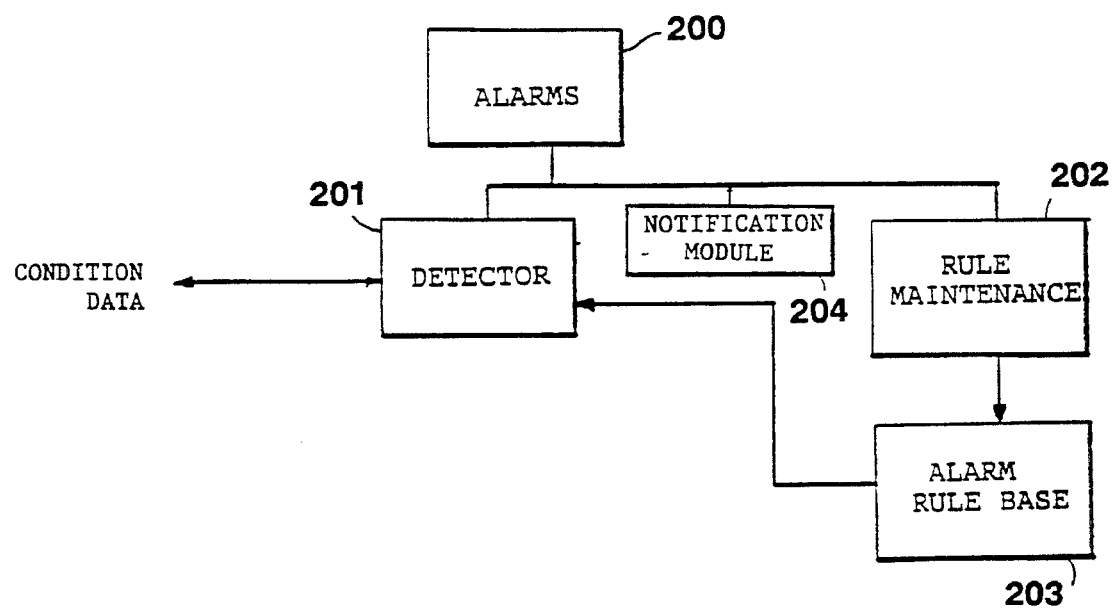
FIG. 10A depicts the structure of a functional module used in establishing and detecting alarm conditions.

FIG. 10A depicts the functional organization of the alarms functional module 11. With reference to FIG. 10A, the alarms functional module 11 includes a general alarms module 200 that receives requests from the module, interprets them and enables one or more detector modules 201 or one or more rule maintenance modules 202 to operate in response thereto. As indicated above, the alarms functional module 11 performs two general types of operations, namely, maintenance Of alarm conditions and detection of alarm conditions.

The maintenance of alarm conditions operation of the alarm functional module 11 is performed by the rule maintenance module 202, which maintains, in an alarm rule base 203, rules which identify each of the alarm conditions. Each rule represents the set of conditions which must be evaluated to determine the existence of an alarm condition. Specifically, the rule maintenance module 202 generates, in response to requests from a presentation module 10, rules, as described below in connection with FIG. 10B, which are stored in the alarm rule base 203. In addition, the rule maintenance module 202, in response to corresponding requests from a presentation module 10, may modify the rules in the alarm rule base 203, which thereby results in modification of the conditions under which an alarm condition, as represented by the rule, will exist.

Similarly, the operation of detection of alarm conditions is performed by the detector module 201, which uses e.g., the condition information in the historical data file (FIG. 5) and the alarm rules in the alarm rule base 203. As described below in connection with FIG. 10B, each rule includes a condition portion, which identifies the conditions. The detector module 201, to detect an alarm condition, determines whether e.g., the contents of the historical data file match the conditions of the various rules. If so, the detector module 201 generates an alarm indication, for transfer by the general alarms module 200 via a notification module 204 to, e.g., presentation module 10 for display to the operator.

The general form of an alarm rule, as generated by the rule maintenance module 202, is depicted in FIG. 10B. With reference to FIG. 10B, an alarm rule includes a condition portion 210, which sets forth the set of condition(s) required for the indication of the alarm. The condition portion includes an expression portion 212, a relational operator 213 and an expression value portion 214. The relational operator 213 relates the expression portion 212 to the expression value portion 214, so that the condition portion 210 evaluates to either a logical TRUE or a logical FALSE. It will be appreciated that, if the expression portion 212 itself evaluates to logical TRUE or logical FALSE, the relational operator 213 and expression value portion 214 of the condition portion 210 are not needed. In either case, if the condition portion evaluates to a logical TRUE, an alarm condition exists.

The rule includes an entity and attribute portion 212 and a time value portion 216. The rel-op value portion 213 relates values of one attribute to one value portion 214. The time value portion 216 establishes a time function, and may indicate the times or time intervals at which the condition portion 210 is to be used by the alarm detector module 201.

Providing an alarms functional module 11 permits an operator to establish alarm conditions on a dynamic or as-needed basis. Since the alarm conditions do not have to be pre-established in the control arrangement, the control arrangement can be used in controlling and monitoring a wide variety of diverse complex systems. For example, if the control arrangement is being used to control and monitor distributed digital data processing systems, which may have diverse configurations of nodes communicating over a network, the alarm conditions can be established by an operator based on the particular configuration. In addition, alarm conditions can be added by addition of rules to the alarm rule base 203, if a new alarm condition is discovered during operation of the complex system.

I. OTHER EMBODIMENTS

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system for controlling and carrying cut management functions over an assemblage of entities, wherein said entities interface within said assemblage for control of primary information handling functions and said entities further interface with said system to permit the carrying out of said management functions, said management functions including a function for retrieval of one or more attribute values from an entity, said attribute values identifying the state of operation of said entity, said system comprising:

stored management modules carrying out said management functions by executing selected management-related commands, storage containing records of said attribute values, each record including an indication of an associated time, at least one said module storing rules identifying attribute values at one or more times corresponding to alarm conditions and comprising a rule generator for generating rules for storage and an alarm condition detector for retrieving attribute values from storage or said entities and detecting an alarm condition in response to the contents of said rules if retrieved attribute values correspond to an alarm condition.

2. The system of claim 1 wherein said management modules carry out said management functions by independently interpreting and executing selected management-related commands.

3. The system of claim 1 wherein at least some said management functions generate, for display to a user, management information indicating the status of said primary information handling functions of one or more said entities.

4. The system of claim 1 further comprising a historical data recorder for periodically accessing and storing new attribute values in said records in response to a predetermined schedule.

5. The system of claim 1 wherein said rule module is responsive to user commands for generating new rules or modifying existing rules.

6. The system of claim 1 wherein said rules may be enabled or disabled in response to user commands.

7. The system of claim 1 wherein the syntax of said rules comprises an entity and attribute specifier, a relational operator, a value, and a time parameter.

8. A system for controlling and carrying out management functions over an assemblage of entities, said management functions including a function for retrieval of one or more attribute values from an entity, said attribute values identifying the state of operation of said entity, comprising:

stored management modules carrying out said management functions by executing selected management-related commands, storage containing records of said attribute values, each record including an indication of an associated time, at least one said module storing rules identifying attribute values at one more times corresponding to alarm conditions and comprising a rule generator for generating rules for storage and an alarm condition detector for retrieving attribute values from storage or said entities and detecting an alarm condition in response to the contents of said rules if retrieved attribute values correspond to an alarm condition.

9. The system of claim 8 wherein said management modules carry out said management functions by independently interpreting and executing selected management-related commands.

10. The system of claim 8 wherein at least some said management functions generate, for display to a user, management information indicating the status of said primary information handling functions of one or more said entities.

11. The system of claim 8 further comprising a historical data recorder for periodically accessing and storing new attribute values in said records in response to a predetermined schedule.

12. The system of claim 8 wherein said rule module is responsive to user commands for generating new rules or modifying existing rules.

13. The system of claim 8 wherein said rules may be enabled or disabled in response to user commands.

14. The system of claim 8 wherein the syntax of said rules comprises an entity and attribute specifier, a relational operator, a value, and a time parameter.

15. A system for controlling and carrying out management functions over members of a computer network, wherein said members interface within said network for control of primary information handling functions and said members further interface with said system to permit the carrying out of said management functions, said management functions including a function for retrieval of one or more attribute values from a member of said computer network, said attribute values identifying the state of operation of said member, said system comprising:

stored management modules carrying out said management functions by executing selected management-related commands, storage containing records of said attribute values, each record including an indication of an associated time, at least one said module storing rules identifying attribute values at one or more times corresponding to alarm conditions and comprising a rule generator for generating rules for storage and an alarm condition detector for retrieving attribute values from storage or said entities and detecting an alarm condition in response to the contents of said rules if retrieved attribute values correspond to an alarm condition.

16. A method for controlling and carrying out management functions over an assemblage of entities, wherein said entities interface within said assemblage for control of primary information handling functions and said entities further interface with said system to permit the carrying out of said management functions, said management functions including a function for retrieval of one or more attribute values from an entity, said attribute value identifying the state of operation of said entity, comprising:

carrying out said management functions by executing selected management-related commands within management modules, storing records of said attribute values, each record including an indication of an associated time, and in at least one said module, storing rules identifying attribute values at one or more times corresponding to alarm conditions generating rules for storage, and retrieving attribute values from storage or said entities and detecting an alarm condition in response to the contents of said rules if retrieved values correspond to an alarm condition.

17. The system of claim 15 further comprising
a historical data recorder operating in one member of said computer network for periodically accessing and storing new attribute values into records at said one member in response to a predetermined schedule.

18. The system of claim 15 wherein
at least some said management functions generate, for display to a user, management information indicating the status of said primary information handling functions of one or more said members.

19. The system of claim 15 wherein said rule module is responsive to user commands for generating new rules or modifying existing rules.

20. The system of claim 15 wherein the syntax of said rules comprises a member and attribute specifier, a relational operator, a value, and a time parameter.

* * * * *

UNITED STATES PATENT AND TRADEMARK OFFICE
CERTIFICATE OF CORRECTION

PATENT NO. : 5,475,838

DATED : December 12, 1995

INVENTOR(S) : Fehskens et al.

It is certified that error appears in the above-identified patent and that said Letters Patent is hereby corrected as shown below:

Column 43, line 23, replace "cut" with --out--.

Signed and Sealed this

Sixteenth Day of April, 1996

Attest:

BRUCE LEHMAN

Attesting Officer

Commissioner of Patents and Trademarks